US012472112B2

(12) United States Patent
Souke et al.

(10) Patent No.: US 12,472,112 B2
(45) Date of Patent: Nov. 18, 2025

(54) PATIENT HANDLING APPARATUS WITH HYDRAULIC CONTROL SYSTEM

(71) Applicant: Stryker Corporation, Kalamazoo, MI (US)

(72) Inventors: Chad Conway Souke, Portage, MI (US); Christopher Gentile, Sturgis, MI (US); Ross Timothy Lucas, Paw Paw, MI (US); Michael T. Brubaker, Portage, MI (US)

(73) Assignee: Stryker Corporation, Portage, MI (US)

( * ) Notice: Subject to any disclaimer, the term of this patent is extended or adjusted under 35 U.S.C. 154(b) by 0 days.

(21) Appl. No.: 18/206,240

(22) Filed: Jun. 6, 2023

(65) Prior Publication Data
US 2023/0320911 A1 Oct. 12, 2023

Related U.S. Application Data

(63) Continuation of application No. 17/192,202, filed on Mar. 4, 2021, now Pat. No. 11,666,494, which is a continuation of application No. 15/949,648, filed on Apr. 10, 2018, now Pat. No. 10,987,260, and a
(Continued)

(51) Int. Cl.
*A61G 1/056* (2006.01)
*A61G 1/02* (2006.01)

(52) U.S. Cl.
CPC .......... *A61G 1/0567* (2013.01); *A61G 1/0237* (2013.01); *A61G 2203/32* (2013.01)

(58) Field of Classification Search
None
See application file for complete search history.

(56) References Cited

U.S. PATENT DOCUMENTS 3,530,514 A 9/1970 McCalley
3,627,377 A 12/1971 Pickles
3,724,003 A 4/1973 Ellwanger et al.
(Continued)

FOREIGN PATENT DOCUMENTS

DE 33 13 843 10/1984
EP 0 364 394 4/1990
(Continued)

OTHER PUBLICATIONS

Stryker Bertec Medical Inc., "The Go Bed Electric Acute Care Bed Maintenance Manual", Dec. 2000, pp. 1-64.
(Continued)

*Primary Examiner* — Adam C Ortiz
(74) *Attorney, Agent, or Firm* — Warner Norcross + Judd LLP

(57) ABSTRACT

An emergency cot includes a litter frame, a base, and a lift assembly supporting the litter frame relative to the base. The lift assembly includes load bearing members pivotally coupled to the litter frame by head-end upper pivot connections and foot-end upper pivot connections and to the base by head-end lower pivot connections and foot-end lower pivot connections for raising or lowering the base or the litter frame with respect to the other. The foot-end upper pivot connections or head-end upper pivot connections are movable toward or away from the longitudinal axis of the litter frame to allow one end of the litter frame to be tilted upwardly.

24 Claims, 14 Drawing Sheets

Related U.S. Application Data continuation of application No. 15/949,624, filed on Apr. 10, 2018, now Pat. No. 10,987,268.

(60) Provisional application No. 62/488,444, filed on Apr. 21, 2017, provisional application No. 62/488,441, filed on Apr. 21, 2017.

(56) References Cited

U.S. PATENT DOCUMENTS

| | | | |
|---|---|---|---|
| 4,747,212 A | 5/1988 | Cavdek | |
| 4,751,754 A | 6/1988 | Bailey et al. | |
| 5,102,377 A | 4/1992 | Spanski | |
| 5,161,274 A | 11/1992 | Hayes et al. | |
| 5,355,743 A | 10/1994 | Tesar | |
| 5,613,255 A | 3/1997 | Bish et al. | |
| 6,071,228 A | 6/2000 | Speraw et al. | |
| 6,289,534 B1 | 9/2001 | Hakamium et al. | |
| 6,352,240 B1 | 3/2002 | Eckstein et al. | |
| 6,421,854 B1 | 7/2002 | Heimbrock | |
| 6,611,979 B2 | 9/2003 | Welling et al. | |
| 6,659,935 B2 | 12/2003 | Costanzo | |
| 6,886,200 B2 | 5/2005 | Blyshak et al. | |
| 7,140,055 B2 | 11/2006 | Bishop et al. | |
| 7,150,056 B2 | 12/2006 | Lemire | |
| 7,171,708 B2 | 2/2007 | Osborne et al. | |
| 7,296,312 B2 | 11/2007 | Menkedick et al. | |
| 7,441,291 B2 | 10/2008 | Hayes et al. | |
| 7,454,805 B2 | 11/2008 | Osborne et al. | |
| 7,533,429 B2 | 5/2009 | Menkedick et al. | |
| 7,610,637 B2 | 11/2009 | Menkedick et al. | |
| 7,653,954 B2 | 2/2010 | Homback et al. | |
| 7,703,158 B2 | 4/2010 | Wilker, Jr. et al. | |
| 7,886,380 B2 | 2/2011 | Hornbach et al. | |
| 7,913,335 B2 | 3/2011 | Carr | |
| 7,926,131 B2 | 4/2011 | Menkedick et al. | |
| 8,074,309 B2 | 12/2011 | Hutchinson et al. | |
| 8,104,120 B2 | 1/2012 | Hornbach et al. | |
| RE43,193 E | 2/2012 | Osborne et al. | |
| 8,151,387 B2 | 4/2012 | Osborne et al. | |
| 8,176,584 B2 | 5/2012 | Hornbach et al. | |
| 8,256,048 B2 | 9/2012 | Bly et al. | |
| 8,291,532 B2 | 10/2012 | Hornbach et al. | |
| 8,321,976 B1 | 12/2012 | Edgerton | |
| 8,458,833 B2 | 6/2013 | Hornbach et al. | |
| 8,502,663 B2 | 8/2013 | Riley et al. | |
| 8,607,384 B2 | 12/2013 | Hornbach | |
| 8,621,690 B2 | 1/2014 | Hornbach et al. | |
| 8,844,078 B2 | 9/2014 | Hornbach et al. | |
| 9,227,822 B2 | 1/2016 | Horne | |
| 10,987,268 B2* | 4/2021 | Souke | A61G 7/1036 |
| 2002/0178502 A1 | 12/2002 | Beasley et al. | |
| 2004/0055087 A1 | 3/2004 | Edgerton | |
| 2005/0241063 A1 | 11/2005 | Ferneau et al. | |
| 2009/0165208 A1 | 7/2009 | Reed et al. | |
| 2009/0222988 A1* | 9/2009 | Reed | A61G 1/0243 |
| | | | 5/626 |
| 2010/0000017 A1 | 1/2010 | Laloge et al. | |
| 2010/0199433 A1 | 8/2010 | Clenet | |
| 2012/0124746 A1 | 5/2012 | Andrienko et al. | |
| 2014/0033435 A1 | 2/2014 | Jutras | |
| 2014/0041120 A1 | 2/2014 | Li | |
| 2014/0189954 A1 | 7/2014 | Lee | |
| 2014/0325759 A1 | 11/2014 | Bly et al. | |
| 2016/0136021 A1 | 5/2016 | Roussy et al. | |
| 2016/0302985 A1 | 10/2016 | Tessmer et al. | |
| 2017/0172819 A1 | 6/2017 | Bourgraf et al. | |
| 2018/0214326 A1 | 8/2018 | Lacasse et al. | |
| 2020/0330306 A1 | 10/2020 | Elku et al. | |
| 2024/0041680 A1 | 2/2024 | Furman et al. | |

FOREIGN PATENT DOCUMENTS

| | | |
|---|---|---|
| EP | 0 736 275 | 1/2000 |
| JP | H02-156950 | 6/1990 |
| KR | 2014-0003301 | 1/2014 |
| WO | 96/29970 | 10/1996 |
| WO | 01/17399 | 3/2001 |
| WO | 01/17400 | 3/2001 |
| WO | 01/23847 | 4/2001 |
| WO | 2007/069912 | 6/2007 |
| WO | 2013/066198 | 5/2013 |
| WO | 2014/150652 | 9/2014 |
| WO | 2014/191684 | 12/2014 |
| WO | 2015/032003 | 3/2015 |

OTHER PUBLICATIONS

Stryker Bertec Medical Inc., "The Go Bed Electric Acute Care Bed Operations Manual", Dec. 2000, pp. 1-26.

* cited by examiner

PATIENT HANDLING APPARATUS WITH HYDRAULIC CONTROL SYSTEM

TECHNICAL FIELD AND BACKGROUND

The present disclosure relates to a patient handling apparatus, such as emergency cot, medical bed, stretcher, stair chair, or other apparatuses that support a patient and, more particularly, to a patient handling apparatus that provides a control system that can increase the deployment speed of a component of the patient handling apparatus. The present disclosure also relates to a patient support apparatus, such as an emergency cot or stretcher or the like, and, more particularly, to an emergency cot that provides an adjustable litter that eases loading of the cot into an emergency vehicle, such as an ambulance.

When a cot is loaded, for example into an ambulance, the litter frame must be raised to a height that is sufficient so that the head-end of the cot can be moved into the compartment of the ambulance, and thereafter the base can be raised so that the whole cot can be pushed into the ambulance. Often this height is above the fully raised height of a cot. To address this, some ambulances are equipped with tilt trays or loading arms that are extended from the rear opening of the compartment and extended under or into the cot to guide or lift the cot to the proper loading height. Ambulances, not so equipped, require the emergency medical technicians to raise the litter relative to the base where it is near the compartment deck height and, thereafter, in some cases, lift the cot so that the head-end wheel on the litter frame can be supported on the compartment deck after which the base can be raised and the cot rolled on the deck into the compartment.

Additionally, when a patient handling apparatus, such as an emergency cot, is unloaded from an emergency vehicle, such as an ambulance, the patient handling apparatus must typically be moved out of the vehicle sufficiently far where the base of the patient handling apparatus clears the ambulance deck and bumper so that the base can then be lowered. The faster the base can be lowered, the faster the patient handling apparatus can be unloaded, and the quicker the patient can be retrieved and delivered to the medical facility, typically an emergency room. Therefore, quick deployment of the base can be critical in some cases.

Accordingly, there is a need to provide a patient handling apparatus with a control system that can quickly move one component relative to another component, such as an emergency cot's base relative to the cot's frame. There is also a need to provide a cot with a litter frame that can be adjusted to facilitate loading of the cot into an emergency vehicle.

SUMMARY

Accordingly, the emergency cot of the present disclosure provides a lift assembly with a compliant mechanism to increase the range of motion of the litter frame and thereby allow loading into a wide range of ambulance compartment heights.

In one form of the disclosure, a cot includes a litter frame with a head-end and a foot-end, a base, and a lift assembly supporting the litter frame relative to the base. The lift assembly includes load bearing members, such as compression/tension members, that are pivotally mounted to the litter frame and the base by head-end and foot-end upper pivot connections and head-end and foot-end lower pivot connections, respectively, for raising or lowering the base or the litter with respect to the other. The foot-end or head-end upper pivot connections are configured to move toward or away from the longitudinal axis of the litter frame to allow the head-end or the foot-end of the litter frame to tilt upwardly.

In one aspect, the foot-end upper pivot connections are movable. For example, the foot-end upper pivot connections are movable in a direction oblique to the longitudinal axis of the litter frame.

In another aspect, the foot-end upper pivot connections are movable along a non-linear path in a direction oblique to said longitudinal axis of the litter frame over a portion of the range of motion of the foot-end upper pivot connections.

In further aspects, the foot-end upper pivot connections are mounted relative to the litter frame by guides. For example, each of the guides may have an elongate guide surface, with each of the elongate guide surfaces having one or more non-linear sections.

In other aspects, the foot-end upper pivot connections comprise rolling foot-end upper pivot connections. In a further aspect, each of the rolling foot-end upper pivot connections includes a roller to roll along a respective elongate guide surface.

According to other aspects, each of the guides has an elongate recess or opening formed therein, with the elongate recesses or openings defining the elongate guide surfaces. For example, each of the guides may be formed from a low friction material, such as a high density polyethylene material.

In yet other aspects, each of the elongate guide surfaces has a first section corresponding to a lowered and substantially un-tilted position of the litter frame and a second section corresponding to a raised and tilted position of the litter frame. The second sections are tilted relative to the first sections to allow the foot-end upper pivot connections to move along the longitudinal axis of the litter frame and to move toward or away from the longitudinal axis of the litter frame to thereby allow the litter frame to be tilted without decoupling the litter frame from the load bearing members.

In one embodiment, the loading bearing members comprise telescoping compression/tension members.

Further, the telescoping compression/tension members may comprise a first pair of telescoping compression/tension members forming a first X-frame and a second pair of telescoping compression/tension members forming a second X-frame.

In one aspect, the telescoping compression/tension members of the first pair of telescoping compression/tension members are connected together at a generally medial portion thereof by a pivot. The telescoping compression/tension members of the second pair of telescoping compression/tension members are connected together at a generally medial portion thereof by another pivot, with the head-end upper pivot connections forming stationary pivot connections at the litter frame, and the foot-end upper pivot connections forming movable connections at the litter frame and being joined by a transverse member.

In yet a further aspect, the foot-end upper pivot connections are configured to allow the head-end of the litter frame to be tilted upwardly without decoupling the litter frame from the load bearing members.

According to another embodiment, an emergency cot includes a litter frame, a base, and a lift assembly supporting the litter frame relative to the base. The lift assembly includes load bearing members, such as compression/tension members, that are pivotally mounted to the litter frame and the base by head-end and foot-end upper pivot connections and head-end and foot-end lower pivot connections, respectively, for raising or lowering the base or the litter with respect to the other. The foot-end or head-end upper pivot connections are configured to move along a non-linear path to allow the head-end or the foot-end of the litter frame to tilt upwardly.

In one aspect, the non-linear path includes one or more linear portions.

In a further aspect, the non-linear path includes one or more arcuate portions.

In yet other aspects, the foot-end upper pivot connections comprise movable foot-end upper pivot connections movable along said non-linear path and are mounted relative to said litter frame by guides.

Further, the upper pivot connections are configured to allow the head-end of the litter frame to be tilted upwardly without decoupling the litter frame from the load bearing members.

According to yet another aspect, the loading bearing members form a pair of X-frames. Each of the X-frames comprises a pair of telescoping members adapted and arranged to raise or lower the base or the litter frame relative to the other of the base and the litter frame. Each of the X-frames is pivotally mounted relative to the litter frame by a respective head-end upper pivot connection and a respective movable foot-end upper pivot connection and pivotally mounted relative to the base by a respective head-end lower pivot connection and a respective foot-end lower pivot connection. Each of the foot-end upper pivot connections is configured to move along the non-linear path to allow the head-end of the litter frame to be tilted upwardly.

In one aspect, the foot-end upper pivot connections are mounted relative to the litter frame by guides, with each of the guides forming a non-linear guide path for a respective foot-end upper pivot connection. For example, the foot-end upper pivot connections may comprise rolling foot-end upper pivot connections.

In yet another aspect, each of the non-linear guide paths has a first section corresponding to a lowered and substantially un-tilted position of the litter frame and a second section corresponding to a raised and tilted position of the litter frame. The second sections are adjacent the first sections and are tilted upwardly relative to the first sections to allow the foot-end upper pivot connections to move along the non-linear path to allow the head-end of the litter frame to be tilted upwardly without decoupling the litter frame from the X-frames.

According to yet another form, a method for adjusting the height of a litter deck of an emergency cot, where the emergency cot has a litter frame supporting the litter deck, a base, and a lift assembly coupled to the litter frame and to the base to raise or lower the base or the litter frame relative to the other, includes extending the lift assembly to raise the litter frame, and tilting the litter frame relative to the lift assembly while still remaining coupled to the lift assembly.

In one aspect, the tilting includes applying a downward force at or near one end, such as a foot-end, of the litter frame.

In a further aspect, the lift assembly is coupled to the litter frame by head-end and foot-end upper pivot connections, and the tilting further including guiding the foot-end upper pivot connections along the non-linear path when the downward force is applied to the foot-end of the litter frame.

In yet another embodiment, a patient support apparatus includes a deck for supporting a patient and a lift assembly. The lift assembly is coupled to the deck by a first pivot and a second pivot. The first pivot has a first pivot axis fixed in position along the longitudinal axis of the deck. The second pivot has a second pivot axis that is guided along a guide path of a guide with respect to the longitudinal axis of the deck. The guide path forms an oblique angle relative to the longitudinal axis of the deck over at least a portion of the guide path. The first end of the deck extends in a cantilevered arrangement beyond the first pivot, and the second end of the deck extends in a cantilevered arrangement beyond the second pivot wherein a force applied adjacent to or at the second end raises the first end of the deck beyond the first pivot.

In one aspect, the guide path includes at least one curved portion.

In another aspect, the first end of the deck extends in a cantilevered arrangement beyond the first pivot, and the second end of the deck extends in a cantilevered arrangement beyond the second pivot wherein a force applied adjacent to or at the second end of the deck shifts the relative distribution of the weight between the first pivot and the second pivot in such a way as to cause a reduction in force on the first pivot and an increase in the relative force on the second pivot.

In yet another aspect, the first end extends in a cantilevered arrangement beyond the first pivot, and the second end of the deck extending in a cantilevered arrangement beyond the second pivot wherein when a force is applied adjacent to or at the second end the guide forms a cam operable to urge the second pivot closer to the first pivot.

For example, the guide path may include at least one curved portion, with the curved portion forming the cam.

In yet other aspects, the first end of the deck comprises a head-end of the deck, and the second end comprises a foot-end of the deck.

In another embodiment, the patient handling apparatus provides a lift assembly with a hydraulic system that can move one of the components relative to the other components more quickly when needed.

In one form, a patient handling apparatus includes a frame, a base, and a lift assembly supporting the frame relative to the base. The lift assembly is configured to extend or contract to raise or lower the base or the frame with respect to the other. The patient handling apparatus also includes at least one hydraulic cylinder to extend or contract the lift assembly, which has a rod, a cap end chamber, and a rod end chamber. The patient handling apparatus also includes a control system with a hydraulic circuit operable to direct the flow of hydraulic fluid to and from the hydraulic cylinder. The control system is configured to open fluid communication between the rod end chamber and the cap end chamber based on an input signal, for example an input signal that is indicative of a status or condition of the patient handling apparatus, to redirect a portion of the fluid output from the rod end chamber to the cap end chamber to thereby increase the extension speed of the rod.

In one aspect, the control system is configured to detect the presence or absence of an external force being applied to the base. The input signal is generated when the control system detects the absence of an external force being applied to the base.

In a further aspect, the control system is configured to no longer redirect the fluid output from the rod end chamber to the cap end chamber when the rod is retracting.

In another aspect, the control system is configured to (1) no longer redirect the fluid output from the rod end chamber to the cap end chamber and/or (2) stop the flow of fluid to the hydraulic cylinder when an external force is applied to the base.

In yet another aspect, the hydraulic circuit includes a valve to control the fluid communication between the rod end chamber and the cap end chamber, and the control system is configured to control the valve. For example, the valve may comprise a solenoid valve, with the control system in communication with the solenoid valve to control the opening or closing of the solenoid valve.

According to yet other aspects, the control system includes a sensor configured to detect the absence or presence of an external force applied to the base, and the control system is configured to open the valve in the absence of an external force applied to the base and when the rod is extending.

In addition, the control system may be configured to control the valve when the control system detects the presence of an external force applied to the base and/or slow or stop the flow of fluid to the hydraulic cylinder.

In other aspects, the control system further includes an apparatus-based communication system for communicating with a loading and unloading apparatus based communication system on a loading and unloading apparatus. For example, the apparatus-based communication systems may be wireless, such as RF communication systems.

In a further aspect, the control system is operable to open or close the solenoid valve based on a signal received from the loading and unloading based communication system.

According to other aspects, the patient handling apparatus further includes a motor to run the pump, wherein the control system is configured to detect a load on the motor (or the pump). For example, the input signal is a function of when the load on the motor. And, the control system may be configured to (1) no longer redirect fluid from the rod end chamber to the cap end chamber and/or (2) stop or slow the fluid flow to the hydraulic cylinder when the load on the motor is near, is at, or exceeds a prescribed value.

In yet other aspects, the control system is configured to detect the location of the frame relative to the base, and further is configured to close fluid communication between the rod end chamber and the cap end chamber when the base is at a prescribed location relative to the frame.

According to yet another aspect, the control system is configured to detect the location of the frame relative to the base or when the lift assembly is in a prescribed configuration and further is configured to (1) no longer redirect the fluid output from the rod end chamber to the cap end chamber and/or (2) slow or stop the flow of fluid to said hydraulic cylinder when said frame is near or at the prescribed location or the lift assembly is near or in the prescribed configuration.

In another embodiment, a patient handling apparatus includes a frame, a base, and a lift assembly supporting the frame relative to the base. The lift assembly is configured for extending or contracting to raise or lower the base or the frame with respect to the other of the base and the frame. The patient handling apparatus also includes a hydraulic cylinder and a hydraulic circuit controlling flow of hydraulic fluid to and from the hydraulic cylinder, and a control system (which includes a sensor) to control the hydraulic circuit. Based on an input signal from or status of the sensor, the control system is configured to redirect the fluid output from the rod end chamber to the cap end chamber when the rod is extending to thereby increase the extension speed of the rod.

In one aspect, the sensor detects the presence or absence of an external force being applied to the base.

In another aspect, the patient handling apparatus also includes a motor, and the hydraulic circuit includes a pump. The sensor detects the load on the motor or the pump.

In another aspect, the sensor detects the location of the base relative to the frame.

According to yet another aspect, the sensor detects the configuration of the lift assembly.

In another embodiment, a method of unloading a patient handling apparatus from a cargo area of an emergency vehicle includes moving the patient handling apparatus adjacent an opening to the cargo area of an ambulance and extending the base of the patient handling apparatus beyond the cargo area wherein the base is no longer supported by the emergency vehicle, and directing hydraulic fluid to the cap end of the hydraulic cylinder to extend the rod. The method further includes automatically redirecting a portion of the hydraulic fluid discharged from the rod end chamber of the hydraulic cylinder to the cap end chamber of the hydraulic cylinder to increase the speed of the rod when the rod is extending.

In one aspect, the method further includes stopping or slowing the flow of fluid to the hydraulic cylinder and/or terminating the redirecting when an external force is applied to the base.

In another aspect, the method further includes detecting when the base is supported by or contacts a ground surface, and stopping or slowing the flow of fluid to the hydraulic cylinder and/or terminating the redirecting when sensing that the base is supported by or contacts a ground surface.

In yet another aspect, the method further includes stopping or slowing the flow of fluid to the hydraulic cylinder and/or terminating the redirecting when the base is near or at a prescribed location relative to the frame. Additionally, the method includes sensing when the base is near or at the prescribed location relative to the frame.

According to yet another aspect, the method further includes stopping or slowing the flow of fluid to the hydraulic cylinder and/or terminating the redirecting based on the lift assembly being near or having a prescribed configuration. Additionally, the method includes sensing the configuration of the lift assembly, and comparing the configuration of the lift assembly to the prescribed configuration.

Accordingly, the present disclosure provides a cot with an improved litter adjustment mechanism. Further, the present disclosure provides a patient handling apparatus with an improved control system that can quickly move one component relative to another, for example, in an emergency situation, in response to a variety of different conditions at the patient handling apparatus.

These and other objects, advantages, purposes and features of the disclosure will become more apparent from the study of the following description taken in conjunction with the drawings.

DETAILED DESCRIPTION

Referring to FIGS. 1-5, the numeral 10 generally designates a patient handling apparatus. The term "patient handling apparatus" is used broadly to mean an apparatus that can support a patient, including a medical bed, and an apparatus that can transport a patient, such as an emergency cot, a stretcher, a stair chair, or other apparatuses that support and/or transport a patient. Further, the term "patient" is used broadly to include persons that are under medical treatment or an invalid or persons who just need assistance. Although the patient handling apparatus 10 is illustrated as an emergency cot, the term "patient handling apparatus" should not be so limited. Although the patient handling apparatus 10 is illustrated as an emergency cot, the term "patient handling apparatus" should not be so limited.

Figure 3:
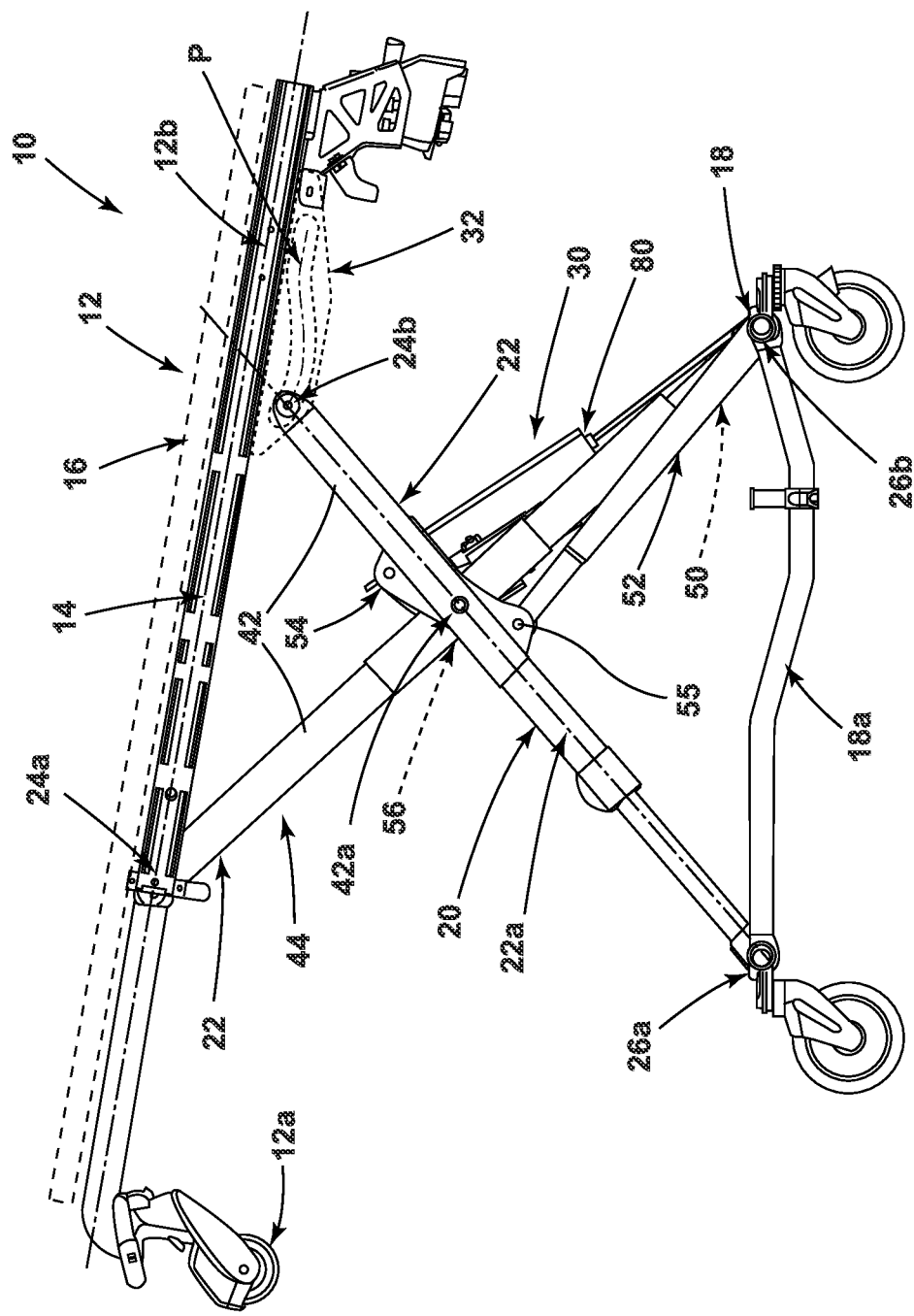
FIG. 3 is a side elevation view of the cot of FIG. 1 with the litter deck shown in phantom.
Figure 4:
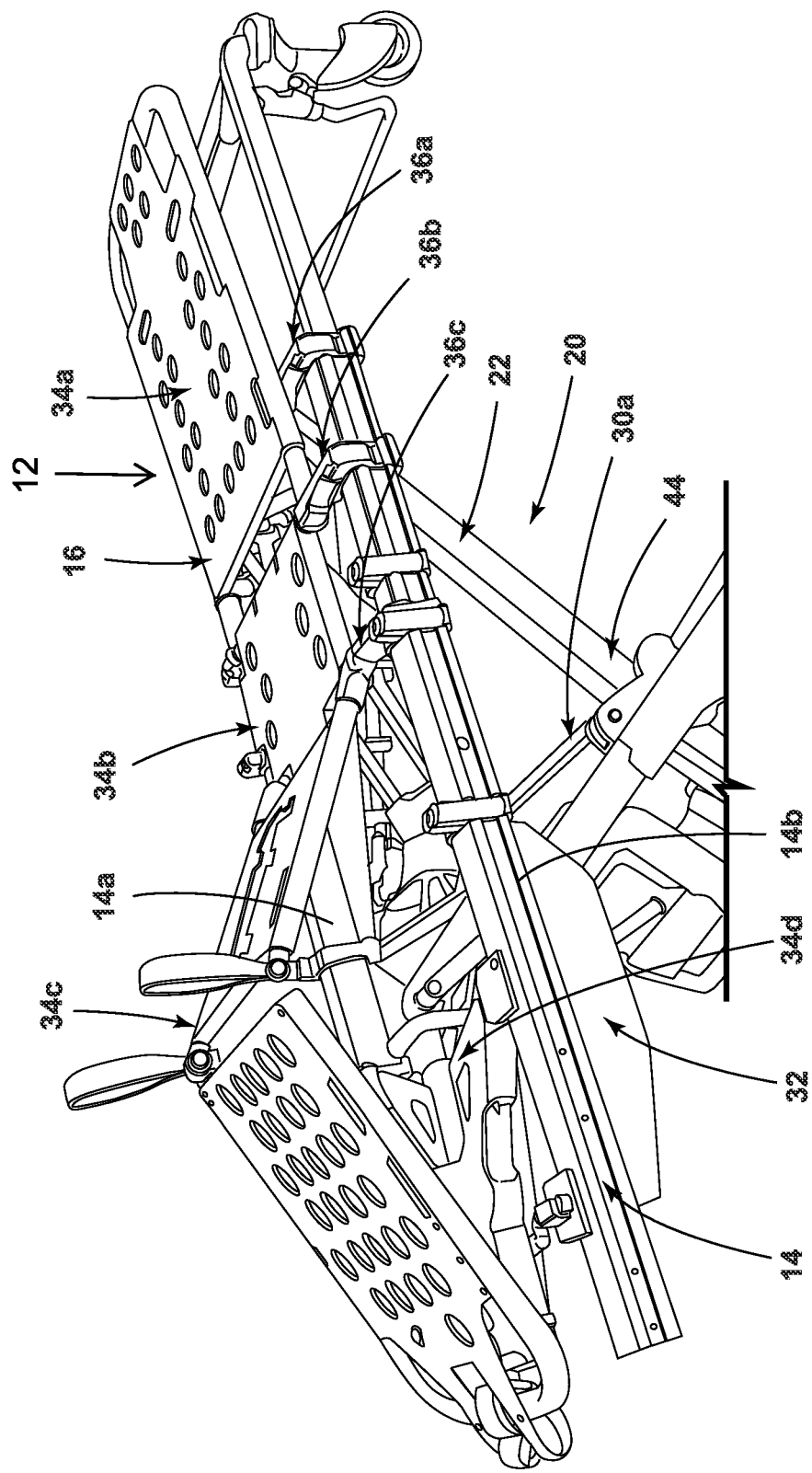
FIG. 4 is a partial perspective view of the cot of FIG. 1 with the litter deck shown mounted to the litter frame.
Figure 5:
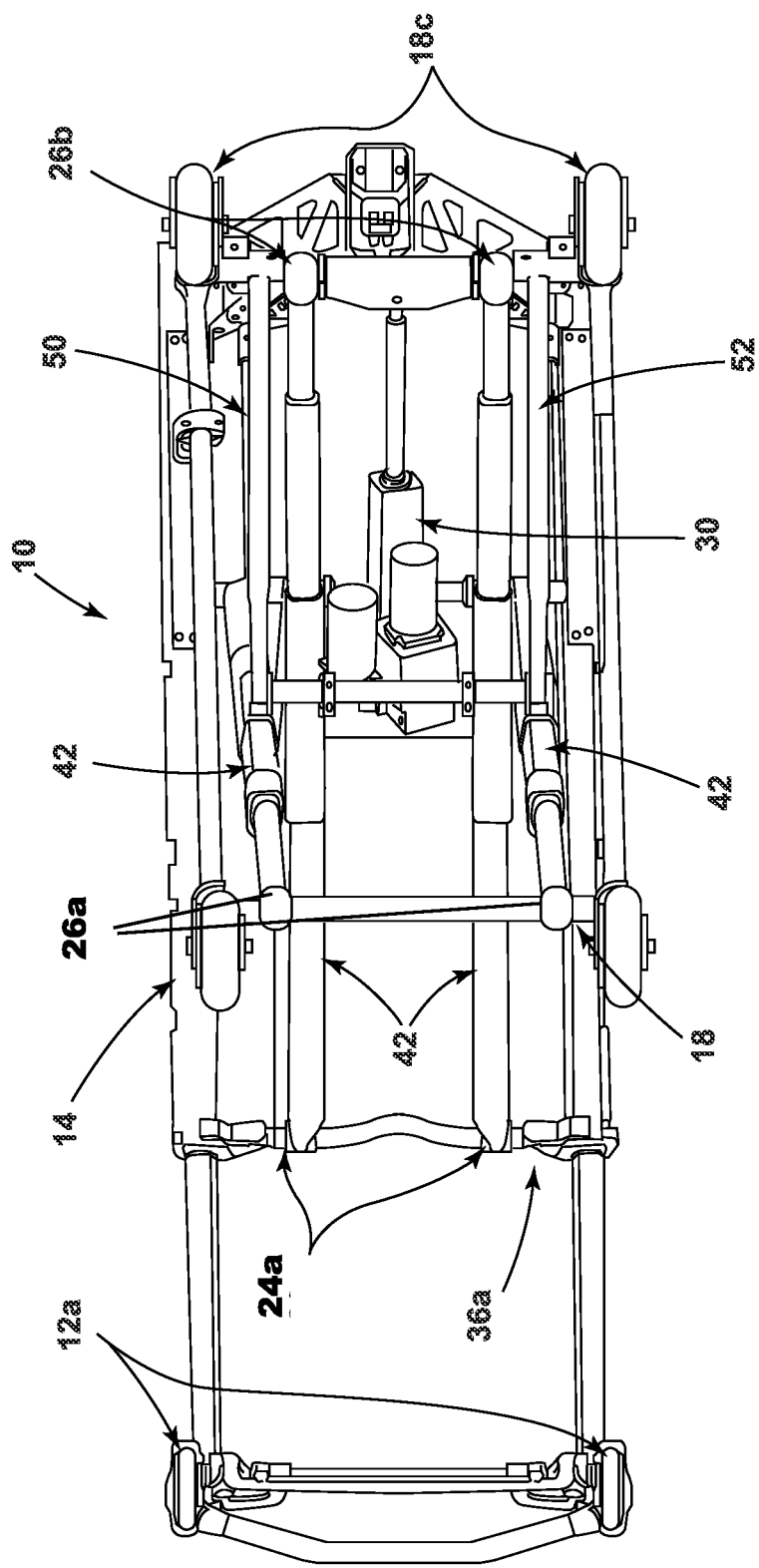
FIG. 5 is a bottom plan view of the cot of FIG. 2.

As best seen in FIGS. 3-4, emergency cot 10 includes a deck, such as a litter 12, which includes a litter frame 14 and litter deck 16 that supports a patient, and a base 18. As will be more fully described below, cot 10 includes a lift assembly 20 that raises or lowers the base 18 or the litter 12 with respect to the other so that the cot can be rearranged between a more compact configuration for loading into an emergency vehicle, such as an ambulance, and a configuration for use in transporting a patient across a ground surface, as well as for loading the cot 10 into an emergency vehicle. Further, as will be more fully described below, the mounting of lift assembly 20 to the litter frame 14 is configured to allow the litter 12 to be tilted relative to the lift assembly 20 so that one end (e.g. head-end or foot-end) of the litter 12 can be raised beyond the fully raised height of the lift assembly to allow the cot 10 to be inserted more easily into the compartment of an emergency vehicle.

Figure 7:
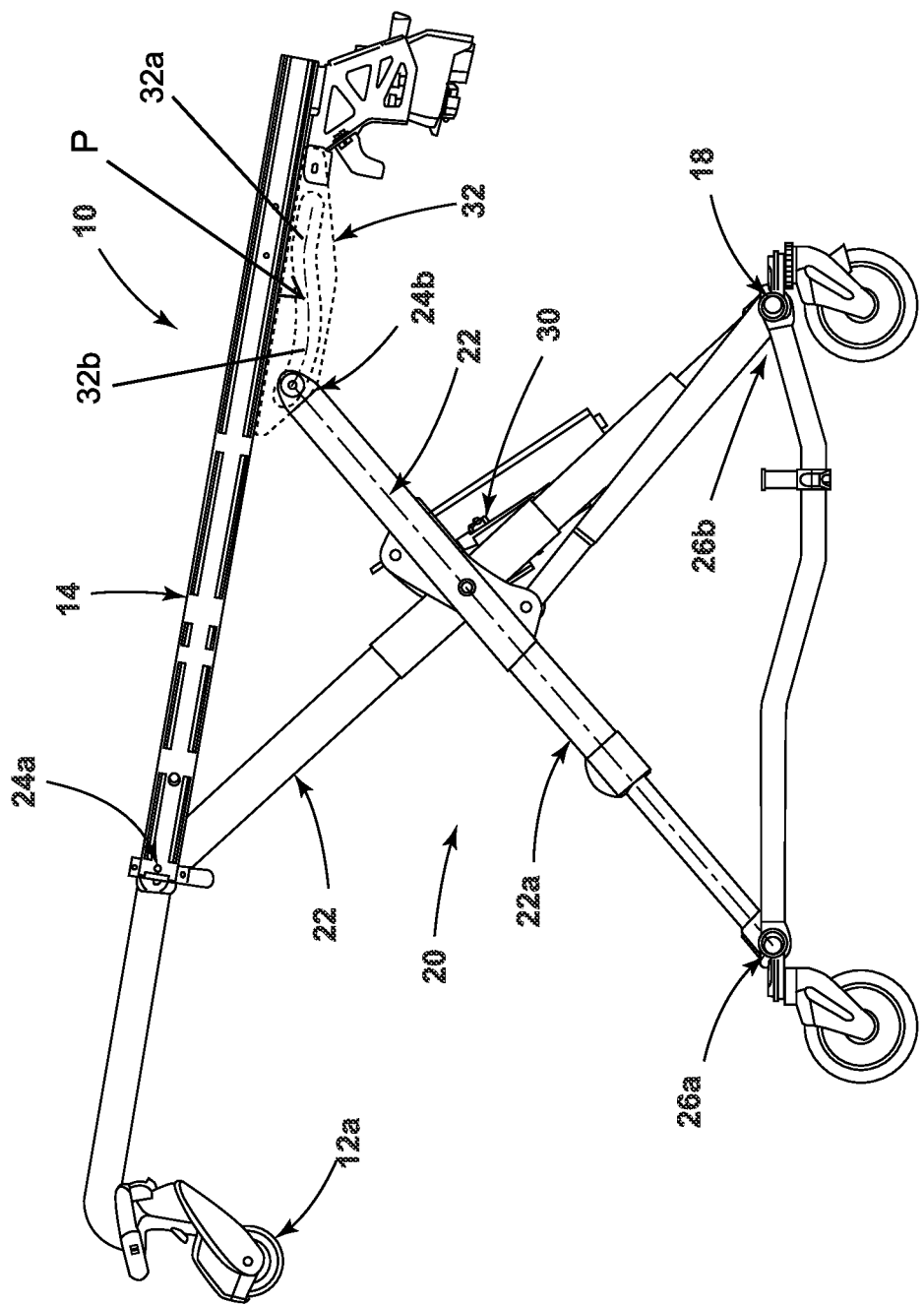
FIG. 7 is similar view to FIG. 1 with the litter deck removed and the head-end of the litter frame fully tilted upwardly.
Figure 8:
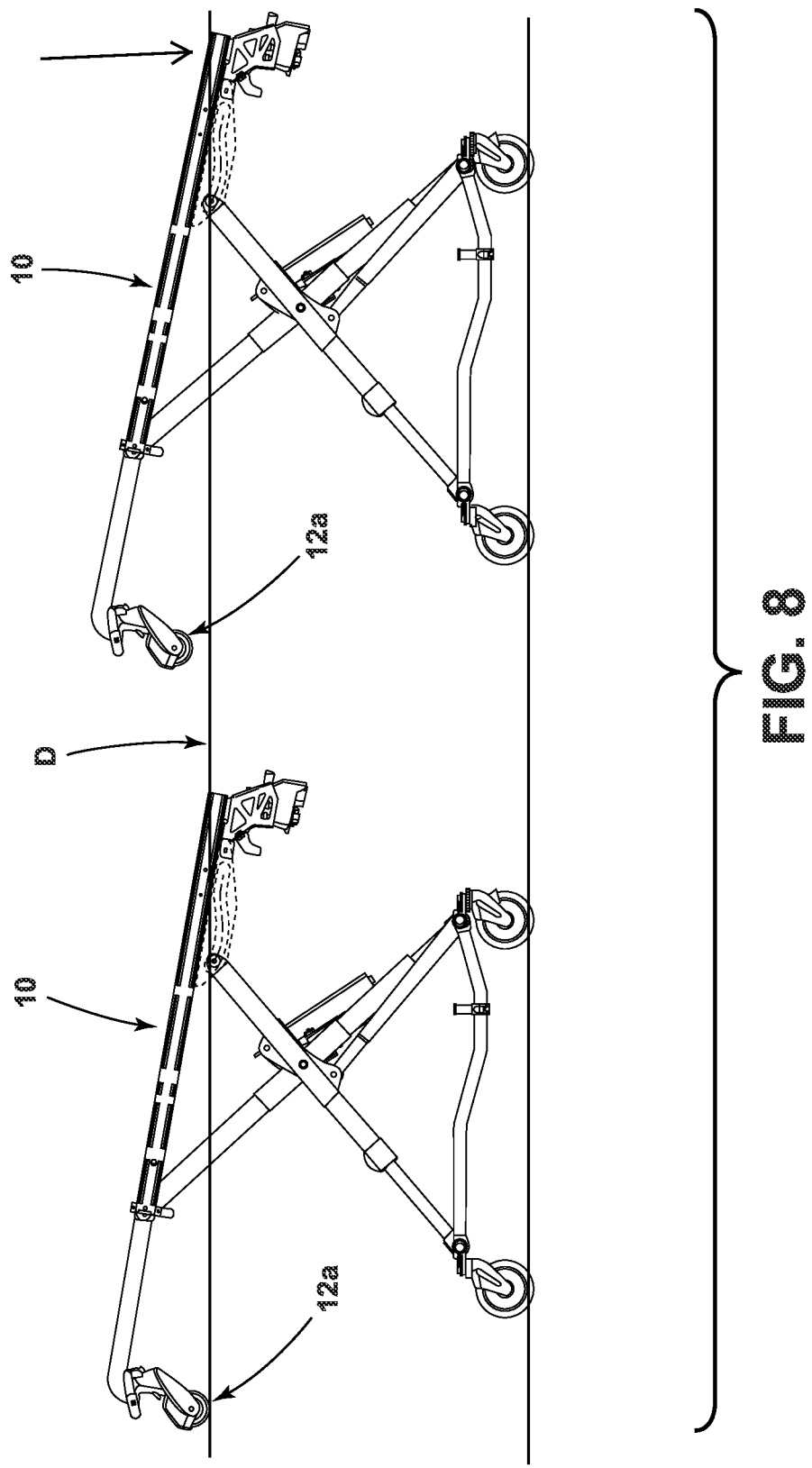
FIG. 8 is a side by side comparison of the cot configurations of FIGS. 3 and 7 to show the increased tilt of the litter frame.

For example, referring to FIG. 8, which shows a side-by-side comparison of the cot 10 when in its fully raised and tilted position (as shown in FIG. 3) and its fully raised, but further tilted position (as shown in FIG. 7), the end (head-end or foot-end) of litter 12 may be tilted upwardly an additional distance in a range of about 0 to 2 inches above a reference line D when a force (represented by the arrow in FIG. 8) is applied to the foot end of litter 12. Reference line D represents the tangent line to the bottom of the litter head-end wheel 12a when in its fully raised and tilted position (as shown in FIG. 3)). This additional tilt allows the cot to have a greater range of motion and may facilitate loading the cot 10 into emergency vehicles with higher compartments.

Referring again to FIG. 3, as will be more fully described below, litter 12 is mounted by a plurality of mounts to base 18 by lift assembly 20, which includes load bearing members 22 pivotally coupled to the litter frame 14 and to the base 18. In the illustrated embodiment, load bearing members 22 are pivotally coupled to the litter frame 14 by mounts in the form of head-end upper pivot connections 24a and foot-end upper pivot connections 24b. Further, as will be more fully described below, head-end upper pivot connections 24a are fixed to the litter frame 14 along the longitudinal axis 12b of litter 12 and foot-end upper pivot connections 24b are movable so that the head-end of litter frame 14 can be tilted upwardly, as described above. Alternately, as noted above, the cot 10 may be configured so that the foot-end of litter frame 14 can tilt upwardly, and hence configured with movable head-end upper pivot connections. Optionally, cot 10 may be configured with two movable upper pivot connections, which are configured so that each pivot connection can be fixed (longitudinally) and the other free to move. For example, each pivot connection may include a stop that is manually movable between an operative position to longitudinally fix the pivot connection and a non-operative position where the pivot connection is movable. In this manner, a user can select which end of the litter to pivot relative to the lift assembly.

Figure 1:
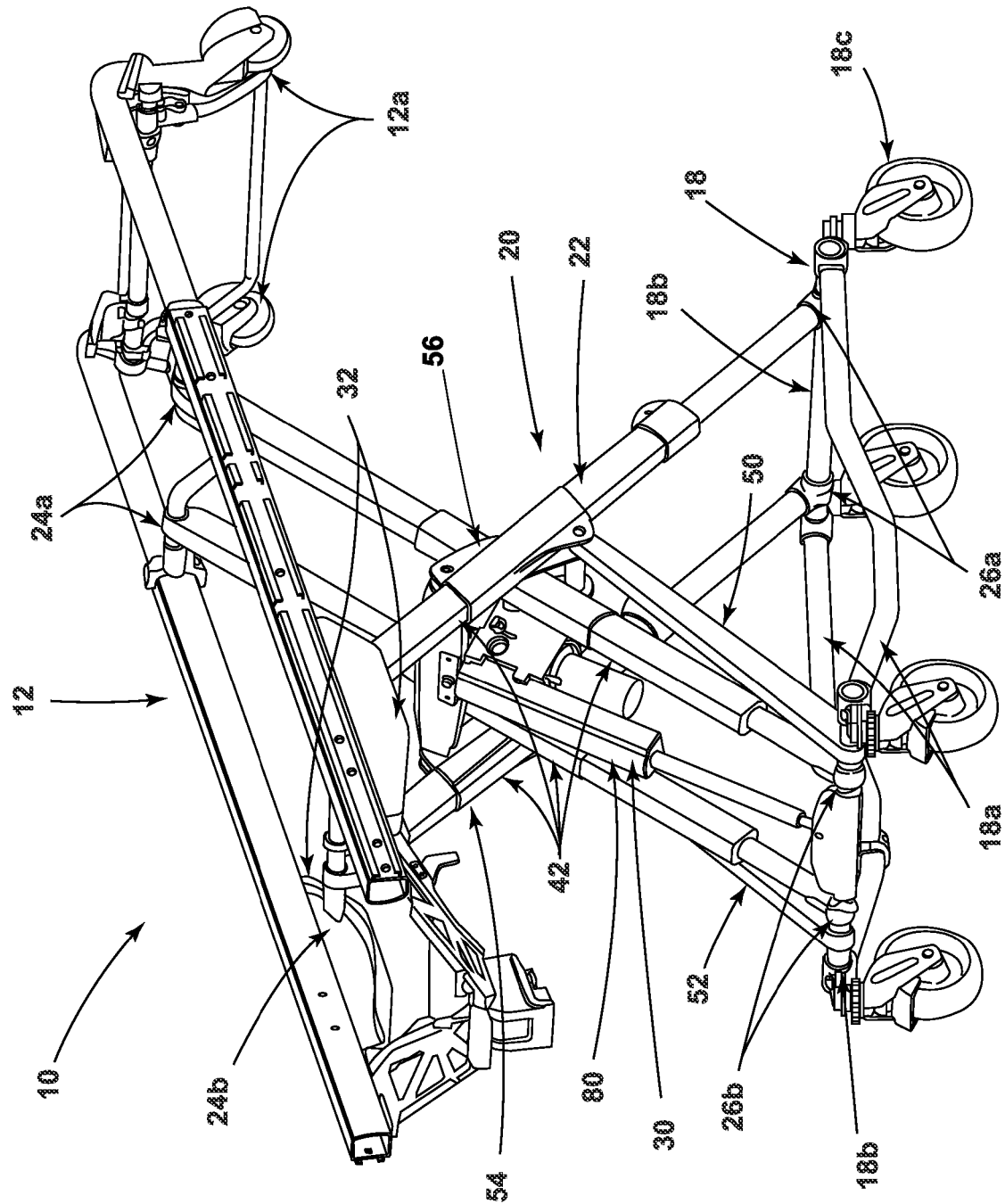
FIG. 1 is a perspective view of a patient handling apparatus (with the patient support surface removed) with the lift assembly in its fully raised configuration.

As best seen in FIG. 1, lift assembly 20 is coupled to base 18 by longitudinally fixed head-end lower pivot connections 26a and longitudinally fixed foot-end lower pivot connections 26b so that when expanded or contract, lift assembly 20 raises or lowers the base 18 or the litter frame 14 with respect to the other. To expand or contract the lift assembly 20, lift assembly 20 includes a linear actuator 30, such as a hydraulic cylinder, described more fully below.

In the illustrated embodiment, movable foot-end upper pivot connections 24b are configured so that they can move in a direction angled (e.g. oblique (acute or obtuse) or even perpendicular) relative to the longitudinal axis 12b of frame 12 and optionally along or relative to the longitudinal axis 12b (FIG. 3) of the litter 12. In this manner, the movable foot-end upper pivot connections 24b follow a non-linear path P that takes them toward or away from the longitudinal axis 12b of the litter 12 over at least a portion of the range of motion of the movable foot-end upper pivot connections 24b to cause the litter frame 14 to tilt relative to the lift assembly 20 (as opposed to being tilted by the lift assembly).

Referring to FIGS. 1-3 and 7, this range of motion where the litter frame 14 tilts may be at one end of the range of motion of the foot-end upper pivot connections 24b and, for example, where lift assembly 20 is raised to its maximum height. Further, after lift assembly 20 has raised litter 12 to its maximum raised height, litter 12 may be tilted further (see FIG. 7) to raise the head-end of the litter 12 so that head-end wheels 12a can be raised sufficiently to rest on the deck of an emergence vehicle compartment. In other words, the litter frame can be manually moved, i.e., tilted, relative to the lift assembly, without moving the lift assembly, including when the lift assembly is fully raised.

Referring again to FIGS. 2 and 3, movable foot-end upper pivot connections 24b are mounted to litter frame 14 by guides 32. Guides 32 form a non-linear guide path P (FIGS. 2-3, 7 and 9) ("non-linear path" means a path that does not form a straight line) for the movable foot-end upper pivot connections 24b. While guide path P is non-linear, path P may include one or more linear sections and one or more non-linear sections, such as arcuate sections. In the illustrated embodiment, each guide 32 provides a non-linear guide path P with at least one linear section 32a that corresponds to the lowered height of the lift assembly 20 where movable foot-end upper pivot connections 24b are at their lowest height and lift assembly 20 is in its folded, most compact configuration (see FIG. 10). The path P of each guide 32 also includes an arcuate section 32b, which is adjacent linear section 32a and may have a single radius of curvature or two or more radii of curvatures. Further, each arcuate section 32b may have two portions, with a first portion corresponding to the fully raised height of lift assembly 20 and a second portion corresponding to the fully raised height of lift assembly 20 (FIG. 3), but with the litter frame 14 tilted further (FIG. 7), as more fully described below.

Figure 9:
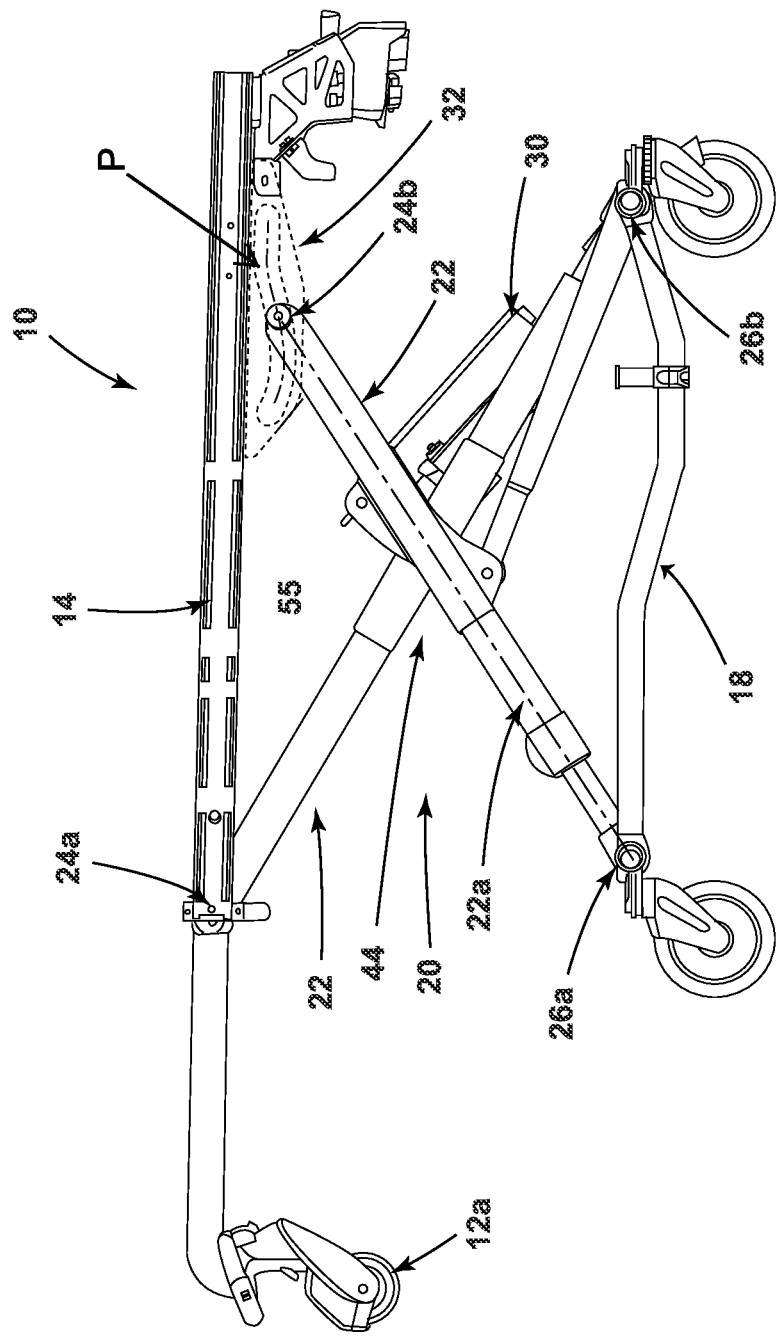
FIG. 9 is another side elevation view similar to FIGS. 1 and 7 but with the litter lowered to an intermediate height.

Thus, when lift assembly 20 starts in its lowermost position and thereafter is extended, movable foot-end upper pivot connections 24b move along guide path P from, for example, one end (see FIG. 10, which corresponds to the lowermost position of lift assembly 20) where the movement of movable foot-end upper pivot connections 24b is initially generally linear (and parallel to longitudinal axis 12b of litter 12) and then non-linear when moved to a non-linear portion of path P, which corresponds to a raised position of lift assembly 20. As lift assembly 20 continues to extend and raise litter 12 further, movable foot-end upper pivot connections 24b continue to move along non-linear path P and initially move further away from longitudinal axis 12b (while still moving relative or along longitudinal axis 12b). During this movement, litter 12 remains substantially horizontal (FIG. 9). As lift assembly 20 continues to extend to its fully raised position, movable foot-end upper pivot connections 24b continue to move along the non-linear portion of path P and, further, continue to move away from longitudinal axis 12b. This movement is then followed by movable foot-end upper pivot connections 24b moving toward longitudinal axis 12b where litter 12 tilts upwardly (FIG. 3). It should be understood that the positions of load bearing members 22 and movable foot-end upper pivot connections 24b are controlled and "locked" in their positions by the hydraulic cylinder.

Thus, the lift assembly 20 is coupled to the litter frame 14 of the litter 12 by a first pair of pivots or pivot connections 24a and a second pair of pivots or pivot connections 24b. As described above, the first pivot connections 24a are fixed in position along the longitudinal axis 12a of the litter 12. The second pivot connections 24b each have a second pivot axis that is guided along the guide path P of a respective guide 32 with respect to the longitudinal axis of the litter. As noted above, the guide path P forms an oblique angle relative to the longitudinal axis 12a of the litter 12 over at least a portion of the guide path P. In addition, the first pivot connections 24a are located inwardly from the first end, e.g. head end, of litter 12, and the second pivot connections 24b are located inwardly from the second end, e.g. foot end, of the litter 12. With this arrangement, the first end, e.g. the head-end, of the litter 12 extends in a cantilevered arrangement beyond the first pair of pivot connections 24a, and the second end, e.g. the foot-end, of the litter 12 extends in a cantilevered arrangement beyond the second pivot connections 24b, wherein a force applied adjacent to or at the second end raises the first end of the litter 12 beyond the first pivot connection.

In this manner, a force applied adjacent to or at the second end 24b shifts the relative distribution of the weight between the first pivot connections 24a and the second pivot connections 24b in such a way as to cause a reduction in force on the first pivot connections 24a and an increase in the relative force on the second pivot connections.

In addition, when the force is applied adjacent to or at the second end the guides 32 form cams operable to urge the second pivot connections 24b closer to the first pivot connections 24a.

Further, as noted, the guide paths of guides 32 may each include at least one curved portion, with the curved portions of the guide paths forming the cams.

Therefore, in the illustrated embodiment, in order to further tilt litter 12 upwardly from its position shown in FIG. 3 to its position shown in FIG. 7, a downward force is applied to the foot-end of the litter 12, which causes relative movement between guides 32 and foot-end upper pivot connections 24b, which results in guides 32 urging (via a cam action) movable foot-end upper pivot connections 24b to move along path P, for example, toward or to the (other) end of path P, and move further towards longitudinal axis 12b. Because the position of foot-end upper pivot connections 24b is essentially fixed or locked in its position shown in FIG. 3, only an external force will cause upper pivot connections 24b to move toward or to the end of path P as shown in FIG. 7. It should be noted that the most tilted position need not be at the end of recess 74 and instead may be provided at an intermediate location along recess 74. As noted this external force may simply be manually applied by an attendant, such as an EMS person, at the foot-end of the litter 12—or it may be applied by an actuator, such as pneumatic, mechanical, electro-mechanical, or hydraulic actuator. Or stated in another way, as best seen and understood from FIG. 8, when the litter deck is in its fully raised position and a force is applied to the foot end, the litter frame 14 pivots around head-end pivot connections 24a, and guides 32 move relative to foot-end pivot connections 24b (down and to the right as viewed in FIGS. 3 and 7, see space beyond upper pivot connections 24b in recess 74 (FIG. 11) when in their fully raised position) causing the head-end to tilt upwardly.

In the illustrated embodiment, each load bearing member 22 comprises a telescoping compression/tension member 42. Compression/tension members 42 may be pivotally joined at their medial portions about a pivot axis 42a (FIG. 3) to thereby form a pair of X-frames 44. The upper ends of each X-frame 44 are, as would be understood, pivotally mounted to the litter frame 14 by head-end upper pivot connections 24a and foot-end upper pivot connections 24b. The lower ends of each X-frame 44 are pivotally mounted to the base 18 by head-end lower pivot connections 26a and foot-end lower pivot connections 26b. However, it should be understood that load bearing members 22 may comprise fixed length members, for example such of the type shown in U.S. Pat. No. 6,701,545, which is commonly owned by Stryker Corp. of Kalamazoo, MI and incorporated herein by reference in its entirety.

Figure 2:
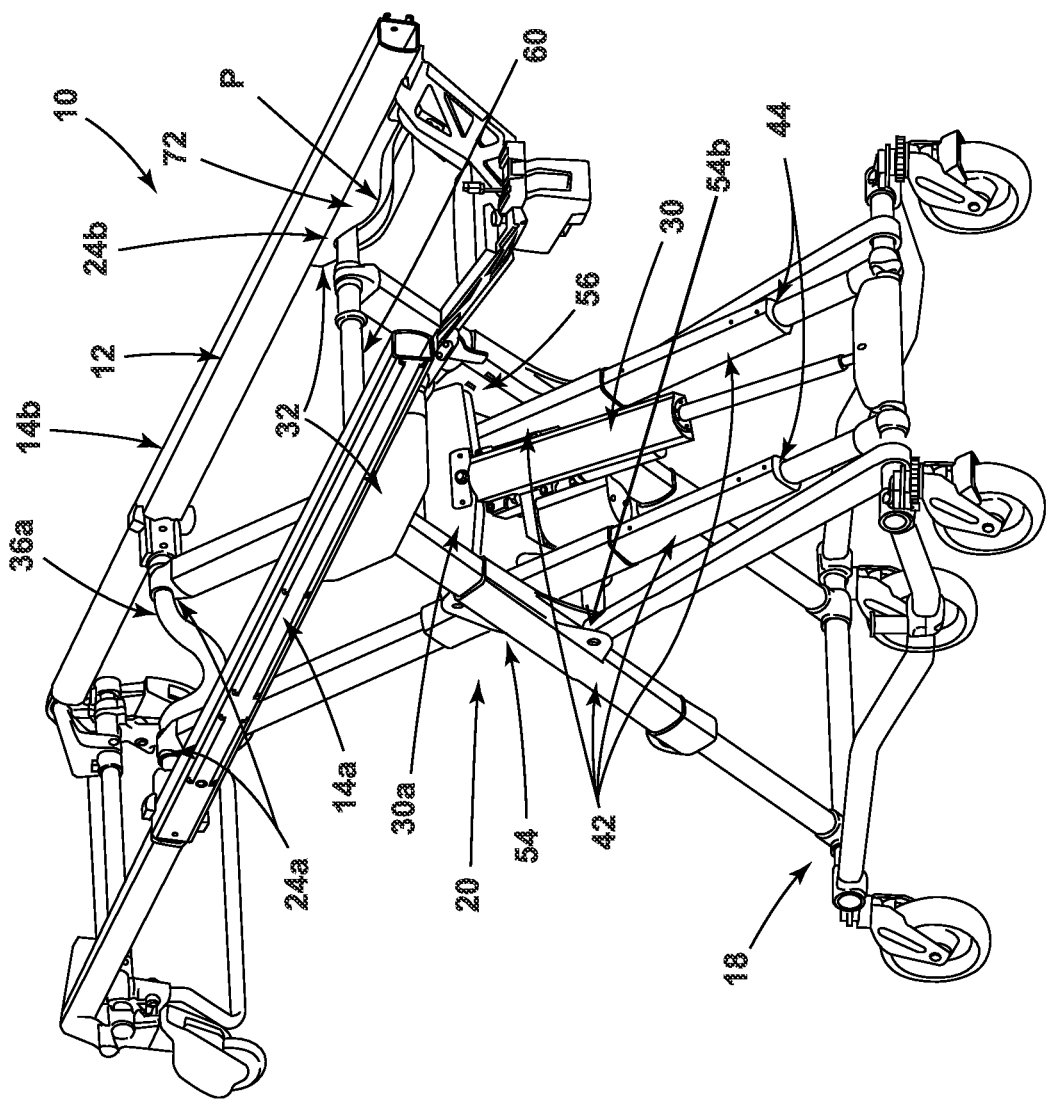
FIG. 2 is a second perspective view of the emergency cot of FIG. 1.
Figure 6:
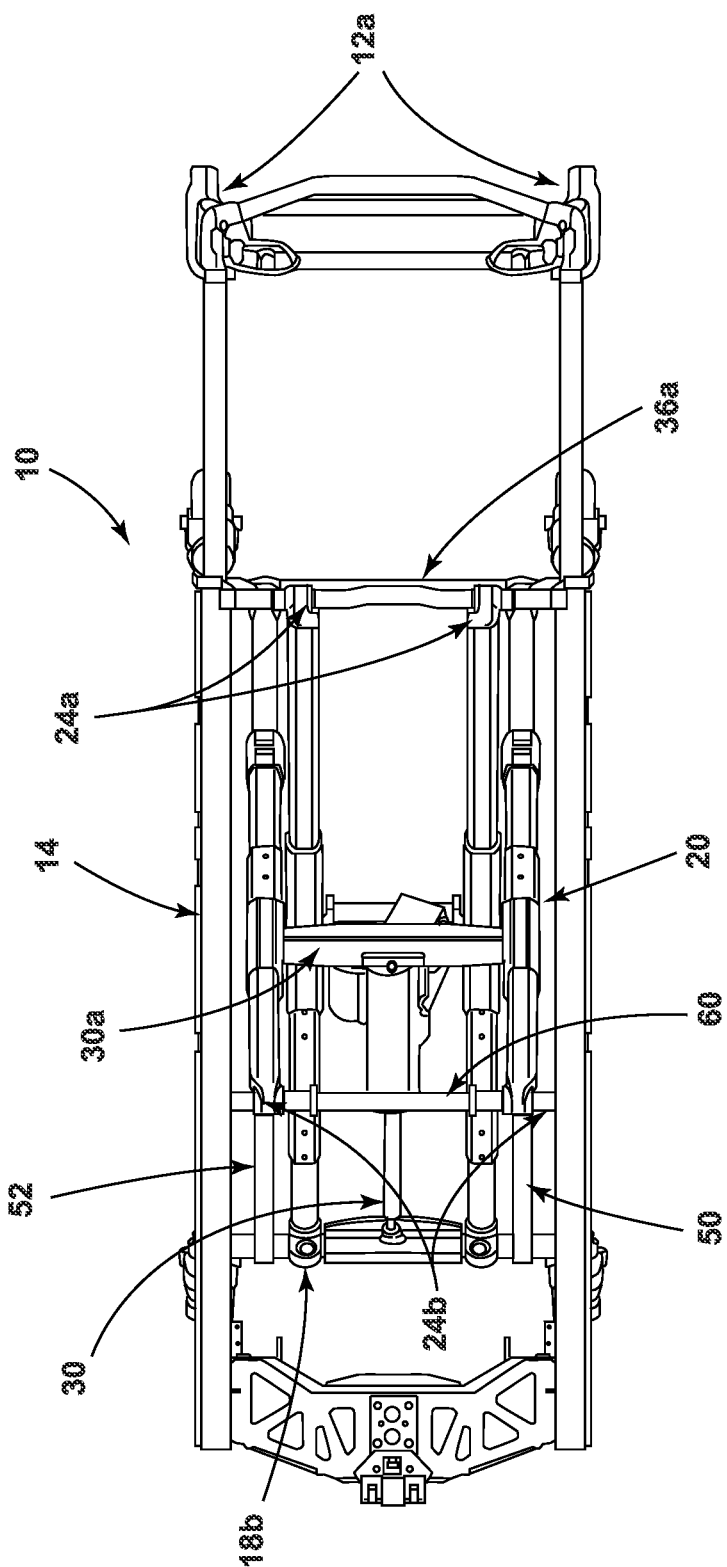
FIG. 6 is a top plan view of the cot of FIG. 2.

In addition to load bearing members 22, cot 10 includes a pair of linkage members 50 and 52, which are pivotally mounted on one end to transverse frame members 18b of base 18 and on their other ends to brackets 54, 56 (FIG. 1), which also provide a mount for the linear actuator 30 described more fully below. Brackets 54 and 56 are mounted about the upper portions of telescoping members 42, and include upper flanges 54a, 56a, respectively, which support there between a transverse member 30a (FIGS. 2 and 6).

Transverse member 30a is pivotally mounted at its ends between flanges 54a, 56a and provides a mount for the fixed end of linear actuator 30. In this manner, as actuator 30 extends or contracts to raise or lower lift assembly 20, the fixed end of actuator 30 can pivot or rotate about the horizontal axis formed by transverse member 30a between brackets 54 and 56.

Referring again to FIG. 1, brackets 54 and 56 also include a second pair of flanges 54b (FIG. 2), 56b, which are below upper flange 54a, 56a and provide mounts for linkages 50, 52, as noted above, and which are secured thereto by fasteners 55 (FIG. 3). Thus, brackets 54 and 56 pivotally mount actuator 30 and linkage members 50 and 52 to X-frames 44, which linkage members 50, 52 provide timing links and, further, moment couplers to assist driving the X-frames 44 when actuator 30 is extended or retracted.

Figure 11:
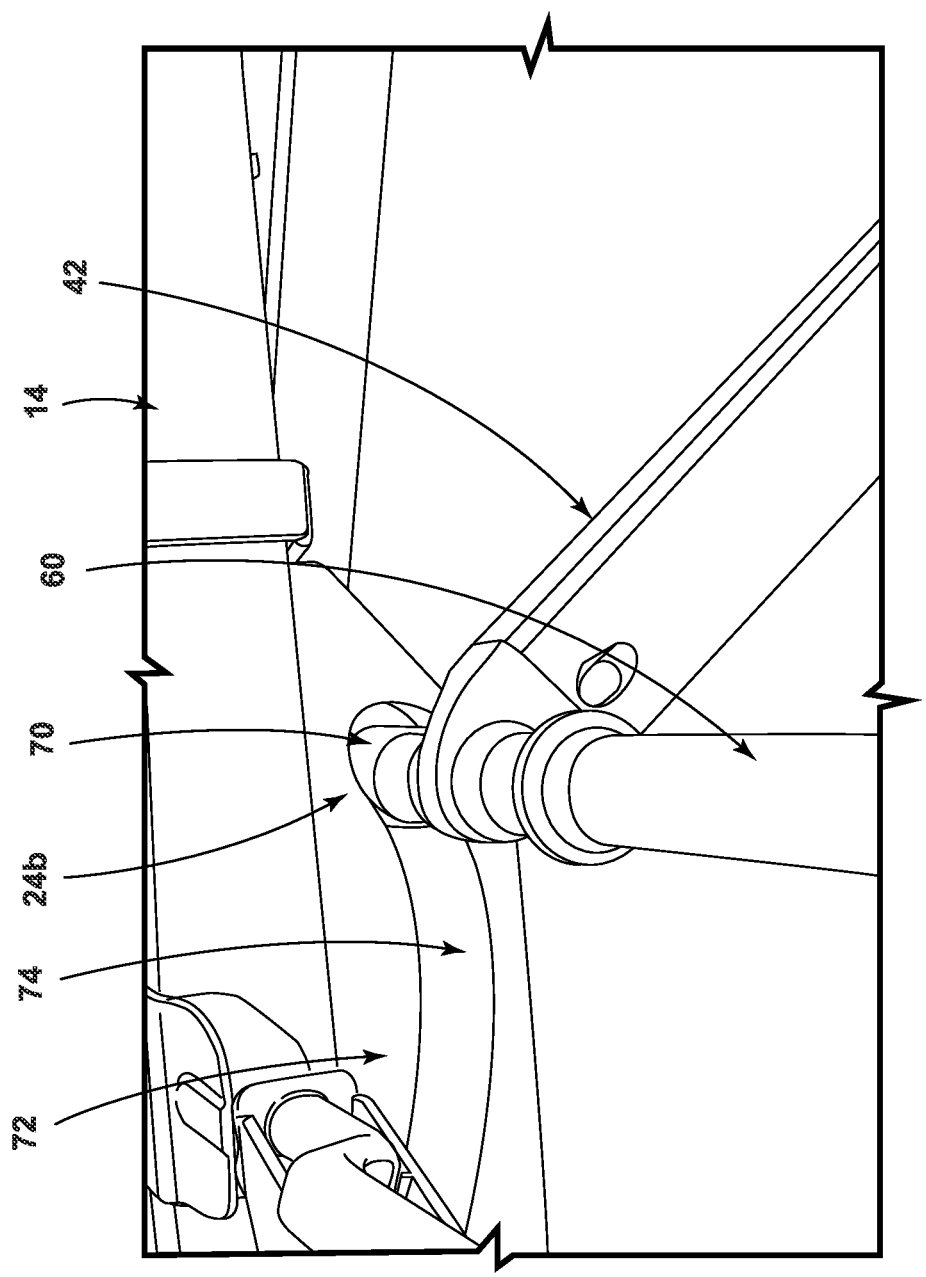
FIG. 11 is an enlarged view of the foot-end pivot connection illustrating a guide that provides a height adjustment function and a tilting function.

As best seen in FIG. 11, foot-end upper pivot connections 24b are supported on or formed by a transverse member 60 (see also FIG. 2), which is mounted to the upper ends of telescoping members 42 by a rigid connection. In the illustrated embodiment, foot-end upper pivot connections 24b are formed by the ends of transverse member 60, which form pivot members. For example, transverse member 60 may comprise a tubular member or solid bar with a circular cross-section. To accommodate the rotation of each telescoping member 42 (as lift assembly 20 is extended or retracted) and allow each telescoping member 42 at the foot-end to pivot and translate along guide path P, foot-end upper pivot connections 24b each include a roller 70 (FIG. 11). Rollers 70 are mounted about the respective ends of transverse member 60 and are guided along guide paths P of guides 32. For example, rollers 70 may each comprise a low friction collar, such as a high density polyethylene collar, or a bearing assembly, which is free to rotate about the end of tubular member and further, as noted, roll along guide path P and allow telescoping members 42 to pivot about litter 12 and litter frame 14.

In the illustrated embodiment, and as best seen in FIGS. 2 and 11, guides 32 are each formed from a low friction member or plate 72, such as a high density polyethylene plate, mounted to litter frame 14. As best seen in FIG. 11, each low friction member or plate 72 includes a recess 74 formed therein, which forms guide path P. Recesses 74 may extend partially into low friction members or plates 72 to form channels therein or may extend through low friction members or plates 72 to form openings therein. In the illustrated embodiment, each recess 74 forms a channel so that guides 32 also can provide a lateral restraint to transverse member 60. Alternately, guides 32 may be formed from a metal member or plate with the recesses formed therein lined with a low friction material, such as high density polyethylene.

As noted above, foot-end upper pivot connections 24b may each include a roller 70 (FIG. 11). Rollers 70 are located in recesses 74 of guides 32 and roll along recesses 74 to guide foot-end upper pivot connections 24b along path P. Alternately, foot-end upper pivot connections 24b may each have a sufficiently low friction surface or interface with recesses 74 to allow foot-end upper pivot connections 24b to slide along path P.

In this manner, foot-end upper pivot connections 24b allow telescoping members 42 to pivot about a moving horizontal axis (i.e. the moving horizontal axis of transverse member 60) (moving in the longitudinal direction and/or vertical direction, as noted above, namely along longitudinal axis 12a and/or toward or away from longitudinal axis 12a) and, further, allow lift assembly 20 to adjust the height of litter 12 relative to base 18.

However, it should be understood that other structures may be provided to form a guide for the upper pivot connections 24b. For example, a linkage assembly (e.g. a four bar linkage assembly) may be mounted to litter frame 14 to guide and provide a guide path for foot-end upper pivot connections 24b.

As best seen in FIG. 4, litter deck 16 optionally includes a backrest section 34a, a seat section 34b, and a leg section 34c, with sections 34a and 34c being pivotally mounted to litter frame 14. Optionally, leg section 34c includes a gatch mechanism 34d, which allows the leg section 34c to bend as shown, for example near the patient's knees, which can prevent a patient from slipping and also make it more comfortable for the patient.

In addition, referring again to FIGS. 2 and 4, litter frame 14 includes a pair of side frame members 14a and 14b, which are interconnected by one or more cross- or transverse frame members 36a-36c. Cross-frame member 36a provides a mounting point for the head-end load bearing members 22 of lift assembly 20. And, the other cross-frame members may provide support for the sections (34a, 34b, and 34c) of litter deck 16. In addition, side frame members 14a and 14b may provide a mounting surface for collapsible side rails (not shown).

As best seen in FIG. 1, base 18 is formed by longitudinal frame members 18a and transverse frame members 18b, which are joined rigidly together to form a frame for base 18. Mounted to the longitudinal frame members 18a are bearings 18c (see also FIG. 5), such as wheels or castors. Transverse frame members 18b provide a mount for the lower pivot connections 24a, 24b of load bearing members 22 and also for the rod end of the actuator 30. As noted above, the upper end (fixed end) of actuator 30 is mounted between the X-frames 44 (formed by load bearing members 22) by transverse member 30a (FIG. 2), which is rotatably mounted to brackets 54, 56.

As noted above, lift assembly 20 is extended or contracted by actuator 30. In the illustrated embodiment actuator 30 comprises a hydraulic cylinder 80 (with an extendible rod), which is part of a hydraulic control system to extend or contract lift assembly 20. Optionally, control of the flow of fluid to and from hydraulic cylinder may be achieved using the hydraulic control circuit and control system described in U.S. Pat. No. 7,398,571, which is commonly owned by Stryker Corp. of Kalamazoo, MI and incorporated herein by reference in its entirety. Alternately, control of the flow of fluid to and from hydraulic cylinder 80 may be achieved using the hydraulic control circuit and control system described below. Further yet, linear actuator 30 may comprise a pneumatic or electro-mechanical actuator.

In addition to providing a mechanism to allow open end of litter frame 14 to be tilted (when an external force is applied to the opposed end of litter frame 14), guide path P may be configured to maintain litter 12 generally horizontal when lift assembly 20 raises litter 12. As noted above, guide path P may include a linear section (where cot 10 is collapsed and litter 12 is fully lowered relative to base, see FIG. 10) and a non-linear section, such as arcuate section. In the illustrated embodiment, the non-linear section comprises an arcuate section where guide path P initially increases the angle between the guide path P and the longitudinal axis 12a of litter 12. By increasing the angle between of path P and the longitudinal axis 12a of litter 12, the tendency of lift assembly 20 to tilt the head-end of litter 12 upwardly when it is extended is counteracted by the shortening of the telescoping members 42 that are coupled to foot-end pivot connections 24b (due to the dip in guide path P) so that litter 12 can remain substantially horizontal while it is being raised. But as lift assembly 20 approaches its full extension, the angle between the guide path P and the longitudinal axis 12a reduces so that litter 12 tilts upwardly as shown in FIG. 3. In this manner, for example, the angle of the longitudinal axis 12a of litter can move from about negative 2 degrees below horizontal (assuming cot is on a horizontal surface) to about horizontal (about 0 degrees above horizontal), and remain generally horizontal while lift assembly 20 lifts litter 12 until lift assembly 20 is almost fully extended, as which point the litter 12 can then be tilted to a range of about 8 to 14 degrees above horizontal, and optionally range of about 10 to 12 degrees above horizontal above horizontal. When litter 12 is further tilted by an external force (manually or by an actuator) as described above, litter 12 can then be tilted to a range of about 10 to 16 degrees above horizontal, and optionally range of about 12 to 14 degrees above horizontal above horizontal.

For further details of litter 12, litter deck 16, litter frame 14, telescoping members 42, base 18, brackets 54 and 56, linkage members 50 and 52, and gatch mechanism 34d, and other structures not specifically mentioned or described herein, reference is made to U.S. Pat. Nos. 5,537,700 and 7,398,571, and published Application No. WO 2007/123571, commonly owned by Stryker Corporation, which are herein incorporated by reference in their entireties.

Figure 10:
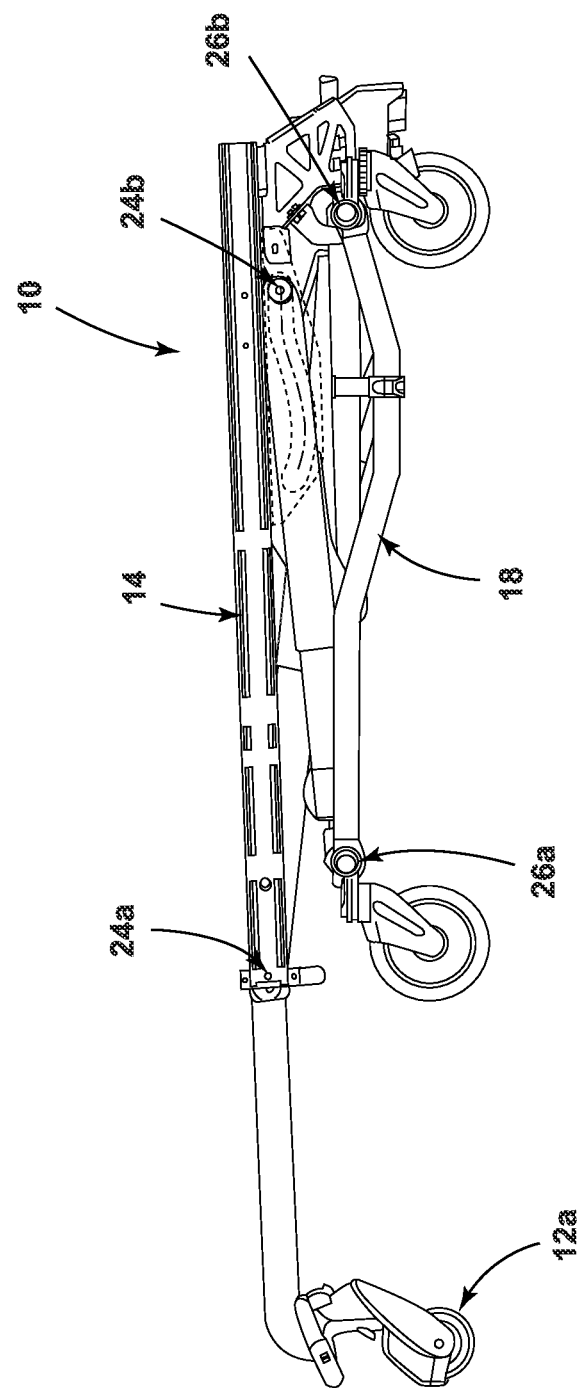
FIG. 10 is similar view to FIG. 1 with the litter fully lowered.

Thus, when the ambulance cot is in the fully collapsed position, and referring to FIG. 10, an extension of the linear actuator 30 will generate a moment force about pivot axis 42a of X-frames 44, which will cause telescoping members 42 to pivot about axis 42a and raise upwardly. Similarly, when linear actuator 30 contracts, actuator 30 will generate a moment force to X-frames 44 about pivot axis 42a in an opposed direction to cause telescoping members 42 to lower. As a result of this geometry, the force in the direction of the extension of linear actuator 30 effects a rapid lifting of the litter 12 from the positions illustrated in FIG. 10 through the mid-height position illustrated in FIG. 9 to the full height position of the lift assembly illustrated in FIGS. 3 and 7. Similarly, when lift assembly 20 is in its fully raised position, the base may be raised or the litter frame may be lowered by contracting actuator 30 (depending on which is supported—that is depending on whether the base 18 is on a ground or floor surface in which case the litter 12 will be lowered when actuator 30 is contracted. If, on the other hand, the litter 12 is supported, e.g. by an attendant or by a loading and unloading apparatus, then contracting actuator 30 will raise base 18 relative to litter 12.

Accordingly, the present disclosure provides a cot with a litter that can be tilted relative to the lift mechanism to facilitate loading of cot into an emergency vehicle, while the lift assembly 20 remains operable to raise or lower the litter.

The terms "head-end" and "foot-end" used herein are location reference terms and are used broadly to refer to the location of the cot that is closer to the portion of the cot that supports a head of a person and the portion of the cot that supports the feet of a person, respectively, and should not be construed to mean the very ends or distal ends of the cot.

As noted above, lift assembly 20 is extended or contracted by actuator 30. In the illustrated embodiment actuator 30 comprises a hydraulic cylinder 80, which is controlled by a control system 82. Although one actuator is illustrated, it should be understood that more than one actuator or cylinder may be used. As will be more fully described below, control system 82 includes a hydraulic circuit 90 and a controller 120, which is in communication with hydraulic circuit 90 and a user interface 120a that allows an operator to select between the lifting, lowering, raising and retracting functions described herein. For example, user interface controls 120a may have a touch screen with touch screen areas or may comprise a key pad with push buttons, such as directional buttons, or switches, such as key switches, that correspond to the lifting, lowering, raising, and retracting functions described herein to allow the user to select the mode of operation and generate input signals to controller 120. As will be more fully described below, the controller 120 may also automatically control the mode of operation.

Referring again to FIGS. 12-14, cylinder 80 includes cylinder housing 84 with a reciprocal rod 86. Mounted at one end of rod 86 is a piston 88, which is located within the cylinder housing 84. The distal end of the reciprocal rod 86 is extended from housing 85 and connected in a conventional manner to transverse member 18b of base 18. And as described above, the other end or fixed end (or cap end) of cylinder 80 is mounted between brackets 54, 56.

Figure 12:
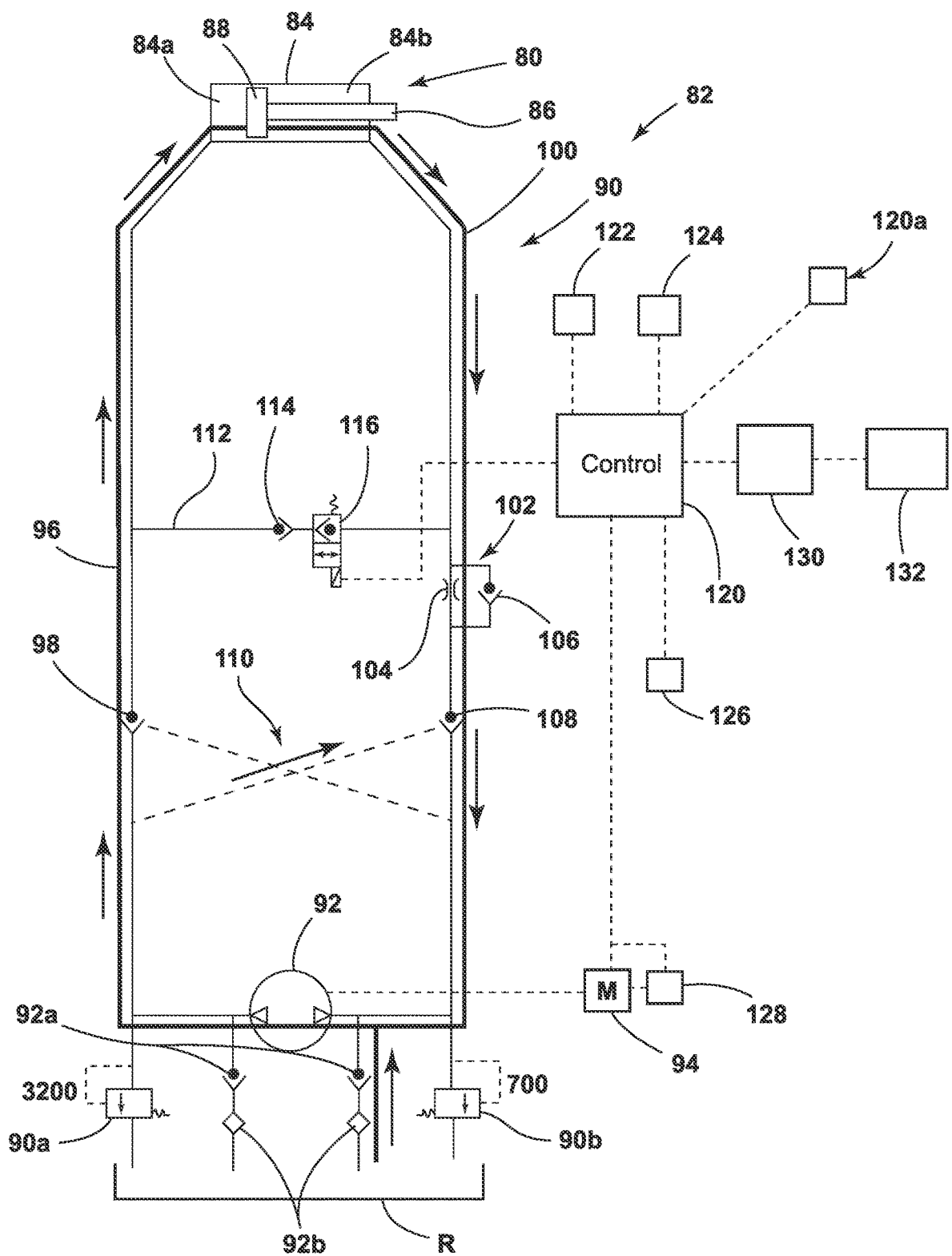
FIG. 12 is a hydraulic circuit diagram of the hydraulic system and control system in one embodiment of the ambulance patient handling apparatus illustrating the flow of hydraulic fluid in the lifting or raising mode of the frame relative to the base of the patient handling apparatus.
Figure 13:
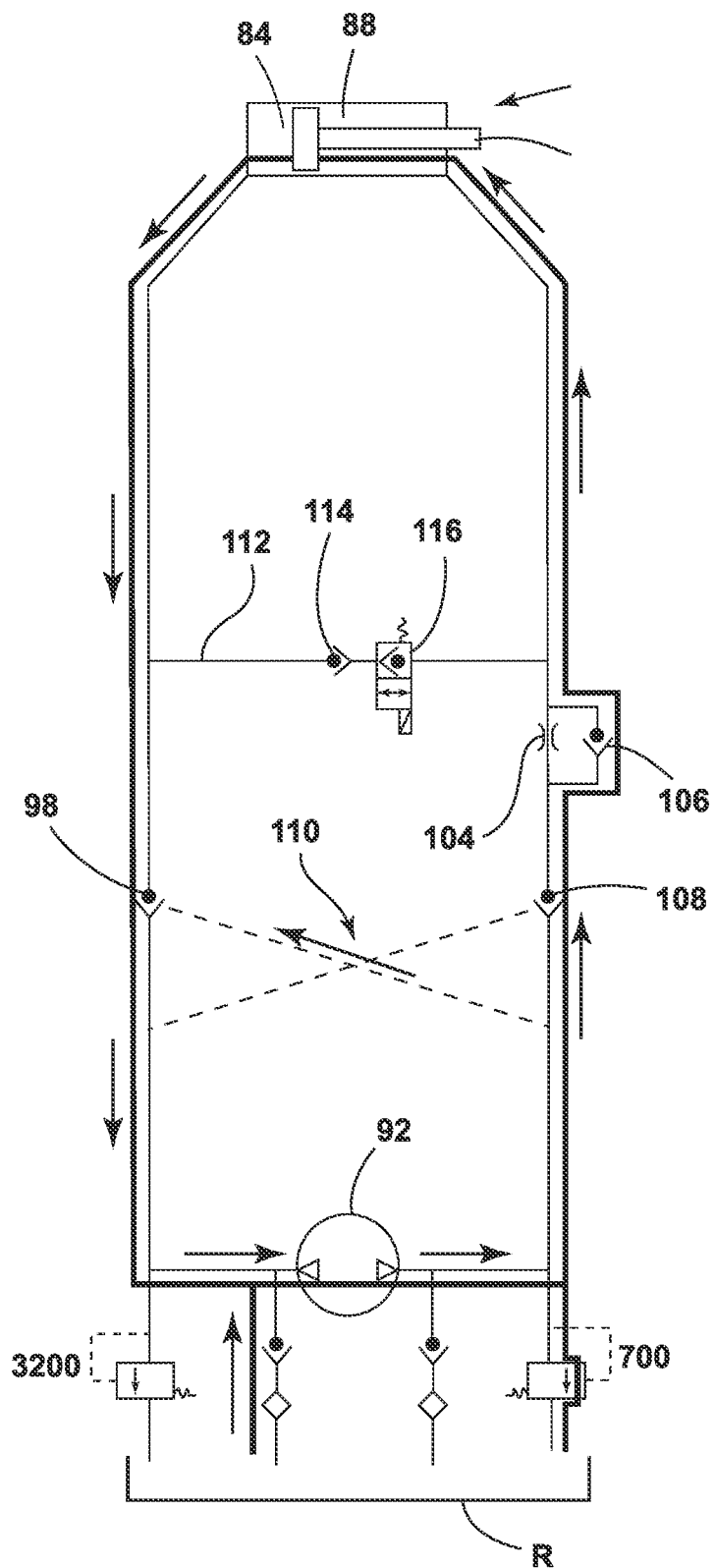
FIG. 13 is the hydraulic circuit diagram of FIG. 12 illustrating the flow of hydraulic fluid in the raising mode of the base of the patient handling apparatus.

Cylinder 80 is extended or retracted by control system 82 to extend or contract lift assembly 20 and generally operates in four modes, namely (mode 1) to raise the frame 12 when base 18 is supported on, for example, a ground surface (FIG. 12), (mode 2) to lower the frame 12 when base 18 is supported on, for example, a ground surface (FIG. 13), (mode 3) to lower or extend base 18 when apparatus 10 is its compact configuration and when the frame 12 is supported, for example, by an attendant or a loading and unloading apparatus (FIG. 14), or (mode 4) to raise base 18 when apparatus 10 is its extended configuration and when the frame 12 is supported, for example, by an attendant or a loading and unloading apparatus (FIG. 13). As will be more fully described below, when lowering or extending base 18 relative to frame 12 (when frame 12 is supported) control system 82 is configured to automatically lower or extend base 18 at a faster speed unless certain conditions exist.

Referring again to FIGS. 12-14, hydraulic circuit 90 includes a pump 92, which is in fluid communication with a fluid reservoir R, to pump fluid from the reservoir R to the cylinder 80. As best seen in FIG. 12, when a user selects the first mode of operation (via the user interface) to raise or lift the frame 12, controller 120 powers motor 94, which operates pump 92 to pump fluid from the reservoir R, through filters 92b and check valves 92a, into the hydraulic circuit 90 to direct the flow of fluid to cylinder 80. To avoid over pressurization, for example, when a heavy patient is supported on frame 12, fluid may be discharged from the hydraulic circuit 90, for example, when the pressure in the hydraulic circuit 90 exceeds a designated pressure (e.g. 3200 psi on the cap side of the hydraulic circuit, and 700 psi on the rod side of the hydraulic circuit) through pressure relief valves 90a and 90b. It is to be understood that the pump 92, cylinder 80, and the various conduits carrying hydraulic fluid to the cylinder are preferably always filled with hydraulic fluid. Pump 92 is driven by an electric motor 94 (both of which are optionally reversible), which motor is controlled by controller 120 to thereby control pump 92.

Referring again to FIG. 12, when an operator wishes to raise frame 12 relative to base 18 (mode 1), and base 18 is supported on a support surface, the operator, using interface controls 120a (FIG. 12), generates input signals that are communicated to controller 120. When operating in the first mode (mode 1), the output of the pump 92 (in the direction indicated by the arrows in FIG. 12), will supply hydraulic fluid through a hydraulic conduit 96, which includes a pilot operated check valve 98, to the cap end chamber 84*a* of the cylinder housing 84, which is on the piston side of rod 86. When fluid is directed to cap end chamber 84*a*, the rod 86 will extend to raise the frame 12 relative to base 18 at a first speed. This mode of operation is used when base 18 is supported on a support surface, such as the ground, which can be detected by a controller 120 in various ways described below. It should be understood, that mode 1 may also be used to lower or extend base 18 when the faster speed of mode 3 described below is not appropriate or desired.

Referring to FIG. 13, when an operator user wishes to select mode 2 or 4—that is lower the frame 12 relative to base 18 (when base 18 is supported on a support surface) or raise base 18 relative to frame 12 (when frame 12 is supported), using interface controls 120*a*, the operator will generate an input signal to controller 120 that will cause controller 120 to operate in mode 2 or 4. In mode 2 or 4, the direction of pump 92 is reversed, so that fluid will flow in an opposite direction (see arrows in FIG. 13) to cylinder 80 through a second hydraulic conduit 100, which is in fluid communication and connected to the rod end chamber 84*b* of the cylinder housing 84. Conduit 100 includes a check valve assembly 102, with an orifice or fluid throttle 104 and a poppet or check valve 106 in parallel, to control the flow of fluid through conduit 100. Fluid flow in this direction will cause the rod 86 to retract and raise the base 12 when the frame 12 is supported or lower the frame 12 relative to base 18 when the base 18 is supported. Also provided is a pilot operated check valve 108 connected between the valve assembly 102 and pump 92. Optionally, valves 98 and 108 are provided by a dual pilot operated check valve assembly 110, which includes both valves (98 and 108) and allows fluid flow through each respect conduit in either direction. The valves 98 and 100 of the dual pilot check valve are operated by the fluid pressure of the respective branch of fluid conduit (96 or 100) as well as the fluid pressure of the opposing branch of fluid conduit (96 or 100), as schematically shown by the dotted line in FIGS. 12-14.

Figure 14:
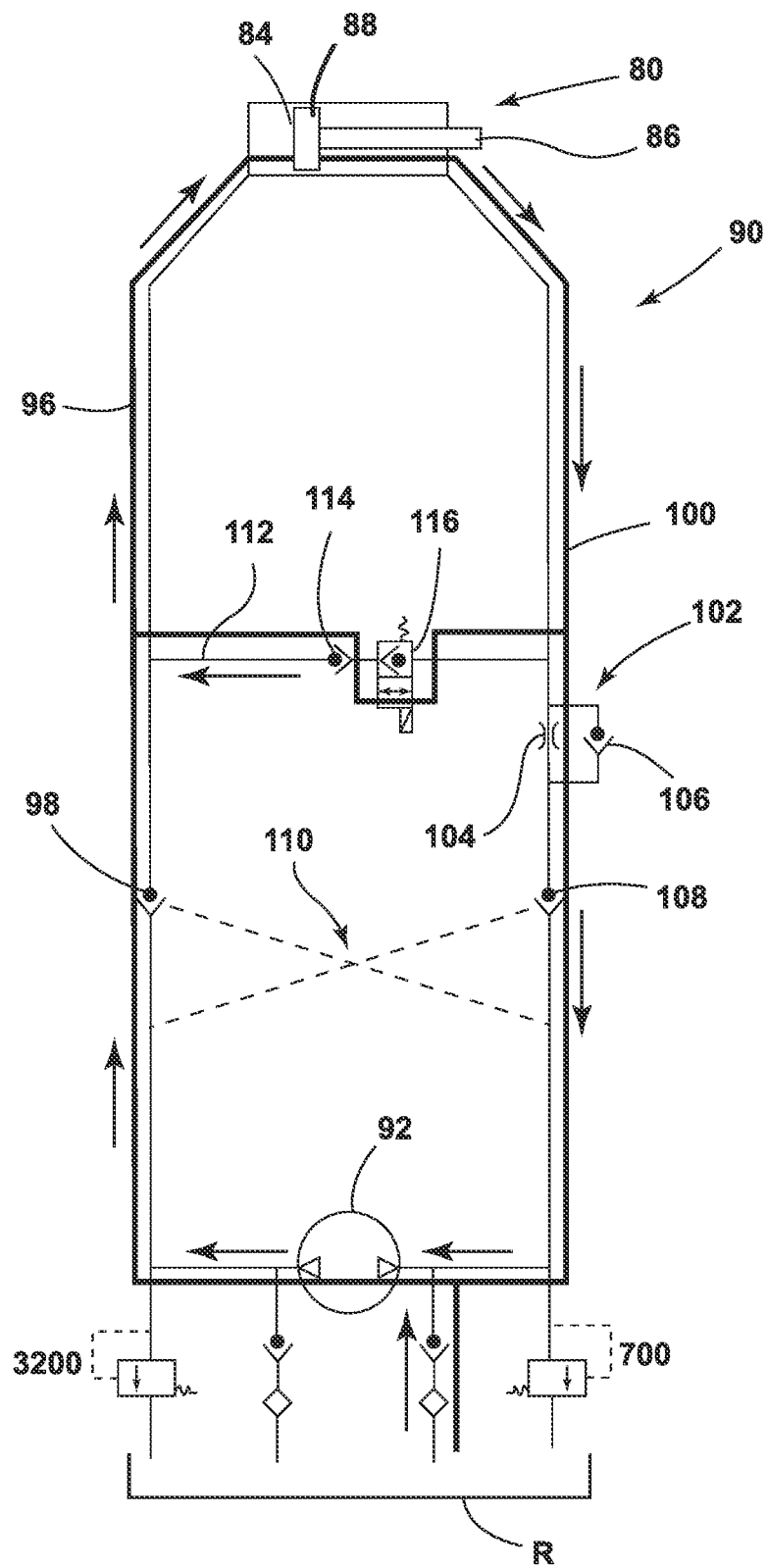
FIG. 14 is the hydraulic circuit diagram of FIG. 12 illustrating the flow of hydraulic fluid in the lowering mode of the base of the patient handling apparatus.

Referring to FIG. 14, when an operator selects the base 18 lowering function and the litter is supported (and the base is unsupported), controller 120 will automatically increase the speed of the cylinder 80 over the first speed (mode 3) (as would be understood by those skilled in the art, the speed of the cylinder or cylinders may be increased by increasing the flow of hydraulic fluid and/or pressure of the hydraulic fluid flowing to the cylinder(s)) unless certain conditions exist. Optionally, user interface 120*a* may allow an operator to generate an input signal to select mode 3 and/or to disable mode 3.

In order to speed up the extension of rod 86 when operating in mode 3, hydraulic circuit 90 includes a third hydraulic conduit 112, which is in fluid communication with conduits 96 and 100 via a check valve 114, to thereby allow fluid communication between the cap end chamber 84*a* and the rod end chamber 84*b* and to allow at least a portion of the fluid output from the rod end chamber 84*b* to be redirected to the cap end chamber 84*a*, which increases the speed of the rod 86 (i.e. by increasing the pressure and/or fluid flow of the fluid delivered to the end cap chamber 84*a*).

To control (e.g. open and close) fluid communication between the cap end chamber 84*a* and rod end chamber 84*b* via conduit 112, conduit 112 includes a valve 116, such as a solenoid valve or a proportional control valve, which is normally closed but selectively controlled (e.g. opened) to open fluid communication between the rod end chamber 84*b* and the cap end chamber 84*a* as described below. As noted, this will allow at least a portion of the fluid output from the rod end chamber 84*b* to be redirected to the end cap chamber 84*a* to thereby increase the speed of rod 86. Optionally, an additional valve, such as a solenoid valve, may be included in conduit 100, for example, between conduit 112 and pump 92, which is normally open but can be selectively controlled (e.g. closed), so that the amount of fluid (and hence fluid pressure and/or fluid flow) that is redirected from the rod end chamber 84*b* may be varied. For example, all the fluid output from may be redirected to the cap end chamber 84*a*. In another embodiment, an additional electrically operated proportional control valve may be used in any of the branches of the conduit (e.g. 96, 100, or 112) to control the rate of fluid flow through the respective conduits and thereby control and vary the speed of the extension of rod 86.

As noted above, control system 82 includes controller 120, which is also schematically represented in FIG. 12. Controller 120 may be powered by the battery (not shown) on board the patient handling apparatus 10. A hydraulic fluid pressure monitoring device (not shown) may be connected to the hydraulic circuit 90 to provide a signal to controller 120 indicative of the magnitude of the fluid pressure, which may be used as input when controlling the hydraulic cylinder 80.

Referring again to FIG. 12, controller 120 may be in communication with one or more sensors, which generate input signals to controller 120 (or controller 120 may detect the state of the sensor) to allow controller 120 to adjust the hydraulic circuit based on an input signal or signals from or the status of the sensors, described more fully below. Suitable sensors may include Hall Effect sensors, proximity sensors, reed switches, optical sensors, ultrasonic sensors, liquid level sensors (such as available from MTS under the brand name TEMPOSONIC), linear variable displacement transformer (LVDT) sensors, or other transducers or the like.

For example, controller 120 may control (e.g. open or close) the valve 116 to increase or stop the increased speed of cylinder 80 and/or slow or stop the pump to slow or stop the cylinder, or any combination thereof based on an input signal or signals from or the status of the sensor(s). Further, controller 120 may control (e.g. close) the valve 116 before, after, or at the same time as slowing or stopping the pump based on an input signal or signals from or the status of the sensor(s). Alternately, controller 120 may slow or stop the pump P in lieu of control (e.g. close) the valve 116 based on an input signal or signals from or the status of the sensor(s).

In one embodiment, control system 82 may include one or more position sensors provided on the patient handling apparatus 10. More specifically, control system 82 may include one or more sensors 122 (FIG. 12) that are used to detect when the base 18 of the patient handling apparatus 10 is contacting the ground or other surface, such as a bumper or another obstruction, which, as noted, may be used as an input signal or signals to the controller 120 to control the hydraulic circuit 90. A suitable sensor may include a transducer, such as a pressure sensor, including a load cell, for example, mounted to one or more of the wheels or casters, which detect when an upward force is applied to the wheels or casters. Alternately, as described below, control system 82 may include one or more sensors to detect the increase in the load on the motor, for example, by detecting an increase in the motor's current, to detect when the base 18 is supported. Other suitable sensors (as noted above) may be used.

For example, when control system 82 detects that the base 18 is contacting or nearly contacting a ground surface or an obstruction, controller 120 may be configured to close valve 116 to no longer allow fluid communication between the rod end chamber 84*b* and the cap end chamber 84*a* via conduit 112 and, further, to stop the pump. In this manner, cylinder 80 will not be driven at the increased speed and, further, optionally stopped when base 18 is supported, for example on the deck of the emergency vehicle or when it is supported on a ground surface, or if it encounters an obstruction. Additionally, controller 120 may slow or stop the pump, either before, after or at the same time as closing valve 116, or instead of closing valve 116. Optionally, before, after or at the same time as closing valve 116, controller may reverse the motor to avoid excess pressure build up in the hydraulic circuit 90.

So for example, if an attendant is removing patient handling apparatus from an emergency vehicle, and the operator has selected a lowering base function, and controller 120 detects that the base 18 is no longer supported, controller 120 will automatically open valve 116 so that cylinder 80 will be driven at the increased speed. On the other hand, once base 18 contacts or nearly contacts the ground surface and/or the base 18 is fully or nearly fully lowered, as will be more fully described below, controller 120 may close valve 116 so that cylinder 80 can no longer be driven at the increased speed and, further, may stop pump 92 so that cylinder 80 will no longer extend. As noted above, controller 120 may reverse the motor to avoid excess pressure in hydraulic circuit 90. Further, as noted, controller 120 may optionally stop pump 92 in lieu of closing valve 116.

In addition, or alternately, control system 82 may include one or more sensors 124 (FIG. 12) that detect the height of the patient handling apparatus 10. As noted above, suitable sensors may include Hall Effect sensors, proximity sensors, reed switches, optical sensors, ultrasonic sensors, liquid level sensors (such as available from MTS under the brand name TEMPOSONIC), linear variable displacement transformer (LVDT) sensors, or the like.

For example, in one embodiment, referring to FIG. 11, an array of transducers T may be attached to the frame 12, and a magnet M mounted, for example, to the foot-end upper pivot connections 24b, including for example, to transverse member 60 forming or supporting the foot-end upper pivot connections 24b (e.g. FIGS. 2 and 6). The array of transducers T may be mounted to frame 12 adjacent to or incorporated in guide 32 along path P, as partially shown in FIG. 11. In this manner, as the foot-end upper pivot connections 24b move along path P magnet M will also move along the array of transducers, and the magnetic field of the magnet will be detected by one or more of transducers T to create an input signal or signals to the controller 120 that is indicative of the height position of the patient handling apparatus 10.

Controller 120, based on this signal or these signals, may control the hydraulic circuit 90. For example, controller 120 may have a height value stored therein (in the controller's memory or a separate memory in communication with controller 120) against which controller 120 compares the signal or signals. Based on whether the detected height (detected by the transducer or transducers) exceeds or is equal to or is less than the stored height value, controller 120 may be configured to control (e.g. open or close) valve 116. For example, when operating in mode (3), where valve 116 is open to increase the speed of rod 86, if controller 120 detects that the height of frame 12 is near or at (or exceeds) the stored height value, then controller may be configured to close valve 116 to no longer drive cylinder 80 at the increased speed, and either before, after, or while closing valve 116 may optionally slow or stop the pump. Further, as noted above, controller 120 may reverse the motor to avoid excess pressure in hydraulic circuit 90. Alternately, controller 120 may optionally stop pump 92 in lieu of closing valve 116.

In one embodiment, the stored height value may be less than the maximum height, and, therefore, controller 120 may be configured to close valve 116 before lift assembly reaches its maximum height. Additionally, as generally described above, controller 120 may be configured to slow or stop the pump to prevent overshoot. Further, on the other hand if the stored height value is the maximum height of lift assembly (e.g. the height at which pivot connections 24b reaches the position along the guide path as viewed in FIG. 11)), then controller 120 may configured to also to stop pump 92 either before, after or at the same time controller closes valve 116.

In this manner, when control system 82 does not detect that the base 18 is at a specified height, e.g. when the transducers do not yet detect the magnets that correspond to a specified height of the base 18, control system 82 can operate cylinder at an increased speed but when it detects that the base 18 is near, at or exceeds the specified height, controller 120 may be configured to control hydraulic circuit 90 to slow or stop the extension of rod 86 of cylinder.

In another embodiment, control system 82 can operate cylinder 80 at an increased speed but when it detects that the base 18 is at a height approaching or near the specified height (e.g. before the base 18 reaches the ground or before lift assembly 20 reaches its maximum height or before reaching a prescribed configuration), controller 120 may be configured to control hydraulic circuit 90 to slow or stop the extension of rod 86 of cylinder, using any of the methods described above. That is either by controlling (e.g. closing) valve 116, slowing or stopping the pump, or reversing the motor.

In yet another embodiment, control system 82 may include one or more sensors 126 (FIG. 12) that detect the configuration of the ambulance patient handling apparatus 10. For example, similar to sensor 124 noted above, transducers (see above for list of suitable transducers or sensors) may be placed at different locations about the patient handling apparatus 10 that detect magnets also placed at different locations about the patient handling apparatus 10. In this manner, when a magnet is aligned with the transducer (or one of the transducers), the magnet field will be detected by that transducer, which then generates a signal or signals that indicate that the patient handling apparatus 10 is in a defined configuration (associated with that transducer) of the patient handling apparatus 10. The number of configurations may be varied—for example, a single sensor may be provided to detect a single configuration (e.g. fully raised configuration or a fully lowered configuration) or multiple sensors may be used to detect multiple configurations, with each transducer detecting a specific configuration. Again, the sensors create an appropriate input signal to the controller 120 that is indicative of the configuration of the patient handling apparatus 10.

Further, when multiple configurations are detected, controller 120 may compare the detected configuration of patient handling apparatus 10 to a prescribed configuration and, in response, control the hydraulic circuit 90 based on whether the patient handling apparatus 10 is in or near a prescribed configuration or not. Or when only a single configuration is detected, controller 120 may simple use the signal from the sensor as an input signal and control hydraulic circuit 90 based on the input signal.

When the patient handling apparatus 10 is no longer in the prescribed configuration (e.g. by comparing the detected configuration to a prescribed configuration stored in memory or detecting that it is not in a prescribed configuration), controller 120 may be configured to open or reopen the valve 116 to allow cylinder 80 to operate at its increased speed but then close valve 116 when controller 120 detects that patient handling apparatus 10 is in a prescribed configuration and/or, further, may slow or stop the motor to stop the pump or reverse the motor.

For example, one of the prescribed configurations may be when the lift assembly is in its fully raised configuration. In this manner, similar to the previous embodiment, when controller 120 detects that patient handling apparatus 10 is near or in its fully raised configuration, controller 120 may be configured to close valve 116 so that cylinder 80 can no longer be driven at the increased speed, and further may also stop motor 94 to stop pump 92. As noted above, controller 120 may open or close the valve 116 before, after, or at the same time as stopping the pump (or reversing the motor) based on the input signal or signals from or the status of the sensor(s). Alternately, controller 120 may stop the pump 92 in lieu of closing the valve 116 based on an input signal or signals from or the status of the sensor(s).

In yet another embodiment, the control system 82 may include a sensor 128 (FIG. 12), which is in communication with controller 120, to detect when a load on the motor (or on the pump) occurs. For example, sensor 128 may detect current. In this manner, using sensor 128, controller 12 can detect when the base is supported on a surface, such as the ground or the deck of the emergency vehicle, by detecting when the motor or pump encounter increased resistance, for example, by detecting the current in the motor. As would be understood, this increase resistance would occur when the base 18 is either supported or encounters an obstruction. Further, controller 120 may be configured to detect when the load has exceeded a prescribed value (e.g. by comparing the detected load to a store load value in memory), and optionally close valve 116 to no longer allow fluid communication between the rod end chamber 84*b* and the cap end chamber 84*a* via conduit 112 when the load has exceeded the prescribed value. As noted above, controller 120 may open or close the valve 116 before the load reaches the prescribed value and further before, after, or at the same time as slowing or stopping the pump based on an input signal or signals from or the status of the sensor(s). As noted above, controller may also reverse the motor before, after or at the same time it closes valve 116. Alternately, controller 120 may slow or stop the pump 92 in lieu of closing the valve 116 based on an input signal or signals from or the status of the sensor(s).

So for example, if an attendant is removing patient handling apparatus from an emergency vehicle and has selected the base lowering (or extending) function, and while the base is being lowered at the increased speed, controller 120 detects that the motor or pump is under an increase in load (e.g. detects an increase in current) (which, as noted, would occur when the base 18 is supported, either by a support surface or an obstruction) controller 120 may close valve 116 so that cylinder 80 will no longer be driven at the increased speed. Optionally, controller 120 may also or instead slow or stop the pump and/or stop the pump before closing the valve. Alternatively, controller 120 may simultaneously close the valve 116 and slow or stop the pump. As described above, in yet another embodiment, controller 120 may close the valve 116 prior to base 18 being supported (for example, when the frame 12 or base 18 reaches a prescribed height or when apparatus 10 has a prescribed configuration) and only after controller 120 detects that base 18 has contacted the ground surface and/or the base 18 is fully lowered, controller 120 will stop pump 92 so that cylinder 80 will no longer extend. Or the controller 120 may be configured to stop the pump 92 before the base reaches the ground to avoid overshoot.

The controller 120 may also receive signals indicative of the presence of the patient handling apparatus 10 near an emergency vehicle. For example, a transducer may be mounted to the patient handling apparatus 10, and a magnet may be mounted to the emergency vehicle and located so that when the patient handling apparatus is near the emergency vehicle, the transducer will detect the magnet and generate a signal based on its detection. In this manner, when an operator has selected the base extending (e.g. lowering) function and controller 120 detects that patient handling apparatus 10 is near an emergency vehicle and, further, detects one or more of the other conditions above (e.g. that the base is not contacting a support surface or there is no load on the motor or pump or the patient handling apparatus 10 is not in a prescribed configuration), controller 120 may open valve 116 to allow the cylinder to be driven at the increased speed. In this manner, these additional input signals may confirm that the situation is consistent with a mode 3 operation.

Alternatively, controller 120 may also receive signals indicative of the presence of the patient handling apparatus 10 in an emergency vehicle. For example, a transducer may be mounted to the patient handling apparatus 10, and a magnet may be mounted to the emergency vehicle and located so that when the patient handling apparatus is in the emergency vehicle, the transducer will detect the magnet and generate a signal based on its detection. In this manner, when an operator has selected the base lowering function and controller 12 detects that patient handling apparatus 10 is in the emergency vehicle and detects one or more of the other conditions above (e.g. that the base is not contacting a support surface or there is no load on the motor or pump or the patient handling apparatus 10 is not in a prescribed configuration), the signal indicating that patient handling apparatus 10 is in the emergency vehicle will override the detection of the other conditions and the controller 120 may maintain valve 116 closed to prevent the cylinder from being driven at the increased speed and, further, override the input signal generated by the operator.

In yet another embodiment, the patient handling apparatus 10 may include a patient handling apparatus-based communication system 130 (FIG. 12) for communicating with a loading and unloading based communication system 132 (FIG. 12) on a loading and unloading apparatus. For example, the communication systems 130, 132 may be wireless, such as RF communication systems (including near-field communication systems). For example, the control system 82 may be operable to open or close the valve 116 based on a signal received from the loading and unloading based communication system 132. In this manner, the deployment of the base of the patient handling apparatus 10 may be controlled by someone at the loading and unloading apparatus or someone controlling the loading and unloading apparatus.

In one embodiment, rather than allowing controller 120 to start in mode 3 (when all the conditions are satisfied), controller 120 may be configured initially start the base lowering function in mode 1, where the base is lowered at the slower, first speed. Only after controller 120 has checked that there is a change in the load (e.g. by checking a sensor, for example a load cell or current sensing sensor) on the motor or cot to confirm that the motor or pump are now under a load (which would occur once the apparatus is pulled from the emergency vehicle and the base is being lowered), does controller 120 then switch to mode 3 to operate the cylinder at the faster, second speed. Again, once operating in mode 3, should controller 120 detect one or more of the conditions noted above (base 18 is supported or encounters an obstruction, the height exceeds a prescribed height, the configuration is in a prescribed configuration, the load on the motor or pump exceeds a prescribed value) controller 120 will close valve 116 and optionally further slow or stop pump. As noted above, the valve 116 may be closed by controller 120 after the pump 92 is slowed or stopped or simultaneously.

In any of the above embodiments, it should be understood that control system 82 can control hydraulic circuit 90 to slow or stop the extension of rod 86 of cylinder, using any of the methods described above, before the conditions noted above, such as before reaching a predetermined height, before reaching a predetermined configuration, before making contact with the ground or an obstruction, or before reaching a prescribed load on the motor etc. Further, control of the fluid through the hydraulic circuit may be achieved by controlling the flow rate or opening or closing the flow using the various valves noted above that are shown and/or described. Further, as noted to avoid excess pressure in the hydraulic circuit, controller 120 may reverse the motor when controlling the valves described herein or may slow or stop the motor and pump before reaching the target (e.g. maximum height). Additionally, also as noted, controller 120 may control the hydraulic circuit by (1) adjusting the flow control valves or valves (e.g. valve 116), (2) adjusting the pump 92 (slow down or stop) or 3) adjusting both the flow control valves or valves (e.g. valve 116) and the pump, in any sequence.

Further, it should be understood, in each instance above, where it is described that the controller or sensor or other components are in communication, it should be understand that the communication may be achieved through hard wiring or via wireless communication. Further, although illustrated as discrete separate components, the various components may be assembled or integrated together into a single unit or multiple units.

As noted above, the frame 12 is optionally configured to allow the frame 12 to be tilted relative to the lift assembly 20 so that one end (e.g. head-end or foot-end) of the frame 12 can be raised beyond the fully raised height of the lift assembly to allow the patient handling apparatus to be inserted more easily into the compartment of an emergency vehicle. In addition, the frame 12 can be tilted without decoupling the frame 12 from the lift assembly 20.

In the illustrated embodiment, movable foot-end upper pivot connections 24b are configured so that they can move in a direction angled (e.g. oblique (acute or obtuse) or even perpendicular) relative to the longitudinal axis 12b of the frame 12 and optionally along or relative to the longitudinal axis 12b (FIG. 1) of the frame 12. In this manner, the movable foot-end upper pivot connections 24b follow a non-linear path P that takes them toward or away from the longitudinal axis 12b of the frame 12 over at least a portion of the range of motion of the movable foot-end upper pivot connections 24b to cause the frame 12 to tilt relative to the lift assembly 20 (as opposed to being tilted by the lift assembly).

Referring to FIGS. 1 and 2, this range of motion where the frame 12 tilts may be at one end of the range of motion of the foot-end upper pivot connections 24b and, for example, where lift assembly 20 is raised to its maximum height or may be intermediate the ends of path P. Further, after lift assembly 20 has raised frame 12 to its maximum raised height (see FIG. 2), frame 12 may be tilted further to raise the head-end of the frame 12 so that head-end wheel 12a can be raised sufficiently to rest on the deck of an emergence vehicle compartment.

Referring again to FIG. 1, as described above, movable foot-end upper pivot connections 24b are mounted to frame 12 by guides 32. Guides 32 form a non-linear guide path P (e.g., FIGS. 2-3) ("non-linear path" means a path that does not form a straight line) for the movable foot-end upper pivot connections 24b. While guide path P is non-linear, path P may include one or more linear sections and one or more non-linear sections, such as arcuate sections. In the illustrated embodiment, guides 32 provide a non-linear guide path P with one linear section that corresponds to the lowered height (FIG. 10) of the lift assembly 20 where movable foot-end upper pivot connections 24b are at their lowest height and lift assembly 20 is in its folded, most compact configuration. The path P of each guide 32 also includes an arcuate section, which is the adjacent linear section and may have a single radius of curvature or two or more radii of curvatures. Further, the arcuate section may have two portions, with a first portion corresponding to the fully raised height of lift assembly 20 and a second portion corresponding to the fully raised height of lift assembly 20, but with the frame 12 tilted further (FIGS. 2 and 8).

Thus, when lift assembly 20 starts in its lowermost position and is extended, movable foot-end upper pivot connections 24b move along guide path P from one end (which corresponds to the lowermost position of lift assembly 20) where the movement of movable foot-end upper pivot connections 24b is generally linear (and parallel to longitudinal axis 12b of frame 12) to a non-linear portion of path P, which corresponds to a raised position of lift assembly.

As lift assembly 20 continues to extend and raise frame 12 further, movable foot-end upper pivot connections 24b continue to move along non-linear path P and initially move further away from longitudinal axis 12b (while still moving relative or along longitudinal axis 12b). During this movement, frame 12 remains substantially horizontal. As lift assembly 20 continues to extend to its fully raised position, movable foot-end upper pivot connections 24b continue to move along the non-linear portion of path P and, further, continue to move away from longitudinal axis 12b. This movement is then followed by movable foot-end upper pivot connections 24b moving toward longitudinal axis 12b where frame 12 tilts upwardly (FIG. 1).

It should be understood that the positions of load bearing members 22 and movable foot-end upper pivot connections 24b are controlled and "locked" in their positions by the hydraulic cylinder. In order to further tilt frame 12 upwardly from its position shown in FIG. 1 to its position shown in FIG. 2, a downward force is applied to the foot-end of the litter, which causes movable foot-end upper pivot connections 24b to move (in relative terms) toward the end of path P and move further towards longitudinal axis 12b, which causes frame 12 to further tilt upwardly. Because the position of foot-end upper pivot connections 24b is essentially locked in its position shown in FIG. 1, only an external force will cause foot-end upper pivot connections 24b to move relative to the end of path P as shown in FIG. 2. In other words—the guides 32 move relative to the foot-end upper pivot connections 24b, and consequently the litter tilts. As noted this external force may simply be manually applied by an attendant (e.g. an EMS person) at the foot-end of the litter—or it may be applied by an actuator.

As best seen in FIG. 6, foot-end upper pivot connections 24b are supported on or formed by a transverse member 60, which is mounted to the upper ends of telescoping members 42 by a rigid connection. In the illustrated embodiment, foot-end upper pivot connections 24b are formed by the ends of transverse member 60, which forms pivots for receipt in recesses 74. For example, transverse member 60 may comprise a tubular member or solid bar with a circular cross-section. To accommodate the rotation of each telescoping member 42 (as lift assembly is extended or retracted) and allow each telescoping member 42 at the foot-end to pivot and translate along guide path P, foot-end upper pivot connections 24b optionally each include a roller. The rollers are mounted about the respective ends of transverse member 60 and guided along guide paths P of guides 32. For example, the rollers may each comprise a low friction collar, such as a high density polyethylene collar, or a bearing assembly, which is free to rotate about the end of tubular member and further, as noted, roll along guide path P. Alternately, foot-end upper pivot connections 24b may be configured to slide along path P.

In the illustrated embodiment, guides 32 are each formed from a low friction member or plate, such as a high density polyethylene plate, mounted to frame 12. Each low friction member or plate 72 includes a recess formed therein, which forms guide path P. Alternately, guide 32 may be formed from a metal member or plate with the recess formed therein lined with a low friction material, such as high density polyethylene.

In this manner, pivot connections 26b allows telescoping members 42 to pivot about a moving horizontal axis (i.e. moving horizontal axis of transverse member 60) (moving both in the longitudinal direction and/or vertical direction, as noted above, namely along longitudinal axis 12a or toward or away from longitudinal axis 12a) and, further, allow lift assembly 20 to adjust the height of frame 12 relative to base 18.

In addition, referring again to FIG. 2, frame 12 includes a pair of side frame members 14a and 14b, which are interconnected by cross- or transverse frame members 36a (only one shown). Cross-frame member 36a provides a mounting point for the head-end load bearing members 22 of lift assembly 20. In addition, side frame members 14a and 14b may provide a mounting surface for collapsible side rails (not shown).

For further details of frame 12, telescoping members 44, base 18, brackets 54 and 56, linkage members 50 and 52, and a gatch mechanism, and other structures not specifically mentioned or described herein, reference is made to U.S. Pat. Nos. 5,537,700 and 7,398,571, and published Application No. WO 2007/123571, commonly owned by Stryker Corporation, which are herein incorporated by reference in their entireties.

Thus, when the ambulance patient handling apparatus is in the fully collapsed position, and referring to FIG. 6, an extension of the linear actuator 30 will cause a clockwise (FIG. 6) rotation of the brackets 54, 56 about the axis of fasteners 55. Fasteners 55 secure the upper end of linkage members 50, 52 to X-frames 44. As a result of this geometry, the force in the direction of the extension of linear actuator 30 effects a rapid lifting of the frame 12 to the full height position of the lift assembly illustrated in FIGS. 1 and 8.

For further optional details on how lift assembly 20 is mounted to frame 12, reference is made to copending provisional application entitled EMERGENCY COT WITH A LITTER HEIGHT ADJUSTMENT MECHANISM (Ser. No. 62/488,441) and filed on even date herewith, which is incorporated herein by reference in its entirety.

The terms "head-end" and "foot-end" used herein are location reference terms and are used broadly to refer to the location of the cot that is closer to the portion of the cot that supports a head of a person and the portion of the cot that supports the feet of a person, respectively, and should not be construed to mean the very ends or distal ends of the cot.

While several forms of the disclosure have been shown and described, other forms will now be apparent to those skilled in the art. For example, one or more of the features of the cot 10 may be incorporated into other cots. Similarly, other features form other cots may be incorporated into cot 10. Examples of other cots that may incorporate one or more of the features described herein or which have features that may be incorporated herein are described in U.S. Pat. Nos. 7,398,571; 7,100,224; 5,537,700; 6,701,545; 6,526,611; 6,389,623; and 4,767,148, and U.S. Publication Nos. 2005/0241063 and 2006/0075558, which are all incorporated by reference herein in their entireties. Therefore, it will be understood that the embodiments shown in the drawings and described above are merely for illustrative purposes, and are not intended to limit the scope of the disclosure, which is defined by the claims, which follow as interpreted under the principles of patent law including the doctrine of equivalents.

The embodiments of the invention in which an exclusive property or privilege is claimed are defined as follows:

1. An emergency cot comprising:
   a litter frame having a head-end, a foot-end, and a longitudinal axis;
   a base;
   a lift assembly supporting said litter frame relative to said base, said lift assembly including load bearing members pivotally coupled to said litter frame and said base by a plurality of pivot connections for raising or lowering said base or said litter frame with respect to the other, said plurality of pivot connections including head-end upper pivot connections and foot-end upper pivot connections that pivotally connect said load bearing members to said litter frame, said plurality of pivot connections including head-end lower pivot connections and foot-end lower pivot connections that pivotally connect said load bearing members to said base; and
   at least one of said plurality of pivot connections being mounted relative to said litter frame and being movable along a non-linear path over at least one range of motion of said at least one of said plurality of pivot connections, wherein said at least one of said plurality of pivot connections are mounted relative to said litter frame by guides and are movable along said non-linear path in a direction oblique to said longitudinal axis of said litter frame over at least one range of motion of said at least one of said plurality of pivot connections.

2. The emergency cot of claim 1 wherein said at least one of said plurality of pivot connections corresponds to said foot-end upper pivot connections.

3. The emergency cot of claim 1 wherein each of said guides has an elongate guide surface, wherein each of said elongate guide surfaces has a first section corresponding to a lowered and substantially un-tilted position of said litter frame and a second section corresponding to a raised and tilted position of said litter frame, said second sections of said elongate guide surfaces being adjacent said first sections of said elongate guide surfaces and being tilted relative to said first sections to allow said foot-end upper pivot connections to move along said longitudinal axis and to move toward or away from said longitudinal axis of said litter frame to thereby allow said litter frame to be tilted without decoupling said litter frame from said load bearing members.

4. The emergency cot of claim 3 wherein said second section of each of said elongate guide surfaces is non-linear with a first portion and a second portion wherein said foot-end upper pivot connections move along said longitudinal axis of said litter frame away from said longitudinal axis of said litter frame when said foot-end upper pivot connections move along said first portions of said second sections of said elongate guide surfaces and move toward said longitudinal axis of said litter frame when said foot-end upper pivot connections move along said second portions of said second sections of said elongate guide surfaces to allow said head-end of said litter frame to be tilted upwardly.

5. The emergency cot of claim 3 wherein each of said first portions of said second sections is arcuate.

6. The emergency cot of claim 3 wherein each of said second portions of said second sections is arcuate.

7. The emergency cot of claim 1 wherein said load bearing members comprise telescoping compression/tension members.

8. An emergency cot comprising:
a litter frame having a head-end, a foot-end, and a longitudinal axis;
a base;
a lift assembly supporting said litter frame relative to said base, said lift assembly including load bearing members pivotally coupled to said litter frame and said base by a plurality of pivot connections for raising or lowering said base or said litter frame with respect to the other, said plurality of pivot connections including head-end upper pivot connections and foot-end upper pivot connections that pivotally connect said load bearing members to said litter frame, said plurality of pivot connections including head-end lower pivot connections and foot-end lower pivot connections that pivotally connect said load bearing members to said base; and
at least one of said plurality of pivot connections being mounted relative to said litter frame and being movable along a non-linear path over at least one range of motion of said at least one of said plurality of pivot connections, wherein said foot-end upper pivot connections are guided along a guide path with respect to said longitudinal axis, said guide path forming an oblique angle relative to said longitudinal axis over at least a portion of said guide path, said head-end of said litter frame extending in a cantilevered arrangement beyond said head-end upper pivot connections, and said foot-end of said litter frame extending in a cantilevered arrangement beyond said foot-end upper pivot connections wherein a force applied adjacent to or at said foot-end raises said head-end of said litter frame beyond said head-end upper pivot connections.

9. The emergency cot of claim 8 wherein said guide path includes at least one curved portion.

10. An emergency cot comprising:
a litter frame having a head-end and a foot-end;
a base; and
a lift assembly mounted to said base and said litter frame by a plurality of mounts, said lift assembly operable to raise or lower said litter frame with respect to said base, wherein at least one of said plurality of mounts includes a pivot member, said pivot member being movable along a non-linear path over at least one range of motion of said pivot member, said pivot member mounted relative to said litter frame by guides and is movable along said non-linear path in a direction oblique to a longitudinal axis of said litter frame over at least one range of motion of said pivot member.

11. The emergency cot of claim 10 wherein:
said litter frame can be raised between a fully raised position when said lift assembly is fully extended and a fully lowered position when said lift assembly is fully retracted; and
said plurality of mounts of said lift assembly to said litter frame are configured to allow said litter frame to be tilted relative to said lift assembly when said lift assembly is fully extended so that said head-end of said litter frame can be raised beyond said fully raised position of said litter frame without decoupling said litter frame from said lift assembly.

12. The emergency cot of claim 10 wherein each of said plurality of mounts between said lift assembly and said litter frame includes a pivot member and a guide configured to guide said pivot members.

13. An emergency cot comprising:
a litter frame having a head-end and a foot-end;
a base; and
a lift assembly mounted to said base and said litter frame by a plurality of mounts, said lift assembly operable to raise or lower said litter frame with respect to said base, wherein:
a first one of said plurality of mounts includes a first pivot member, said first pivot member being movable along a non-linear path over at least one range of motion of said first pivot member;
each of said plurality of mounts between said lift assembly and said litter frame includes a pivot member and a guide configured to guide said pivot members;
each of said guides includes a recess to receive a respective pivot member of said pivot members;
said recesses receive and guide said pivot members when said lift assembly is extended or retracted;
said recesses extend beyond fully raised positions of said pivot members; and
said guides are operable to move relative to said pivot members when said pivot members are in their fully raised positions to allow said head-end of said litter frame to be tilted upwardly above said fully raised position of said litter frame.

14. The emergency cot of claim 13 wherein said pivot members include a roller, and said roller is received in and guided by said recesses.

15. The emergency cot of claim 13 wherein each of said recesses includes a curved portion.

16. The emergency cot of claim 13 wherein each of said curved portions includes said fully raised position of said respective pivot member.

17. The emergency cot of claim 16 wherein each of said curved portions extends beyond said fully raised positions of said pivot members until a force is applied to said litter frame to tilt said litter frame above its fully raised position.

18. The emergency cot of claim 13 wherein each of said recesses includes a linear section.

19. The emergency cot of claim 18 wherein said linear sections include fully lowered positions of said pivot members.

20. The emergency cot of claim 13 wherein said first pivot member corresponds to said pivot member of said first one of said plurality of mounts.

21. The emergency cot of claim 13 wherein said non-linear path enables said first pivot member to move uninterrupted from one end to another end of said non-linear path.

22. The emergency cot of claim 1 wherein said non-linear path enables said at least one of said plurality of pivot connections to move uninterrupted from one end to another end of said non-linear path.

23. The emergency cot of claim 8 wherein said non-linear path enables said at least one of said plurality of pivot connections to move uninterrupted from one end to another end of said non-linear path.

24. The emergency cot of claim 10 wherein said non-linear path enables said pivot member to move uninterrupted from one end to another end of said non-linear path.

* * * * *